United States Patent [19]

McCarty et al.

[11] 3,916,168
[45] Oct. 28, 1975

[54] COLOR MATCHING SURFACE COATINGS CONTAINING METALLIC PIGMENTS

[75] Inventors: William H. McCarty, White House Station, N.J.; Kenneth A. Jones, Kankakee, Ill.

[73] Assignee: Mobil Oil Corporation, New York, N.Y.

[22] Filed: Oct. 9, 1973

[21] Appl. No.: 404,560

[52] U.S. Cl. .................. 235/151.3; 444/1; 356/176
[51] Int. Cl.² . G06F 15/06; G06F 15/46; G01J 3/46
[58] Field of Search................ 235/150, 151.3, 155; 356/173, 176; 444/1

[56] References Cited
UNITED STATES PATENTS
3,601,589   8/1971   McCarty.............................. 235/150

Primary Examiner—Edward J. Wise
Attorney, Agent, or Firm—C. A. Huggett

[57] ABSTRACT

In the selection of metallic paint pigments to color match a standard metallic paint coating, the tri-stimulus coordinates of the coating are measured at a plurality of different viewing angles with respect to the surface. A colorimeter has a rotating plaque holder. Incident light passes through blue, green or red filters. The light is reflected from the plaque and is detected by a photocell. By changing the angle of the plaque, tri-stimulus coordinates of the plaque are measured at different viewing angles. The total reflectance of the coating on the plaque is measured in a spectrophotometer. From the measured tri-stimulus coordinates and the measured total reflectance, the measured diffuse and angular reflectance of the coating on the plaque is obtained. A model which relates both the diffuse and the angular reflectance to the concentration of paint pigments is generated on an automatic data processor. Least square fitting between measured and predicted diffuse and angular reflectance is used. A formulation program generates the concentrations of pigments to be used in the initial batch. Thereafter, a shading program successively generates the changes in pigment concentrations which give the best least squares fit to the standard coating.

10 Claims, 9 Drawing Figures

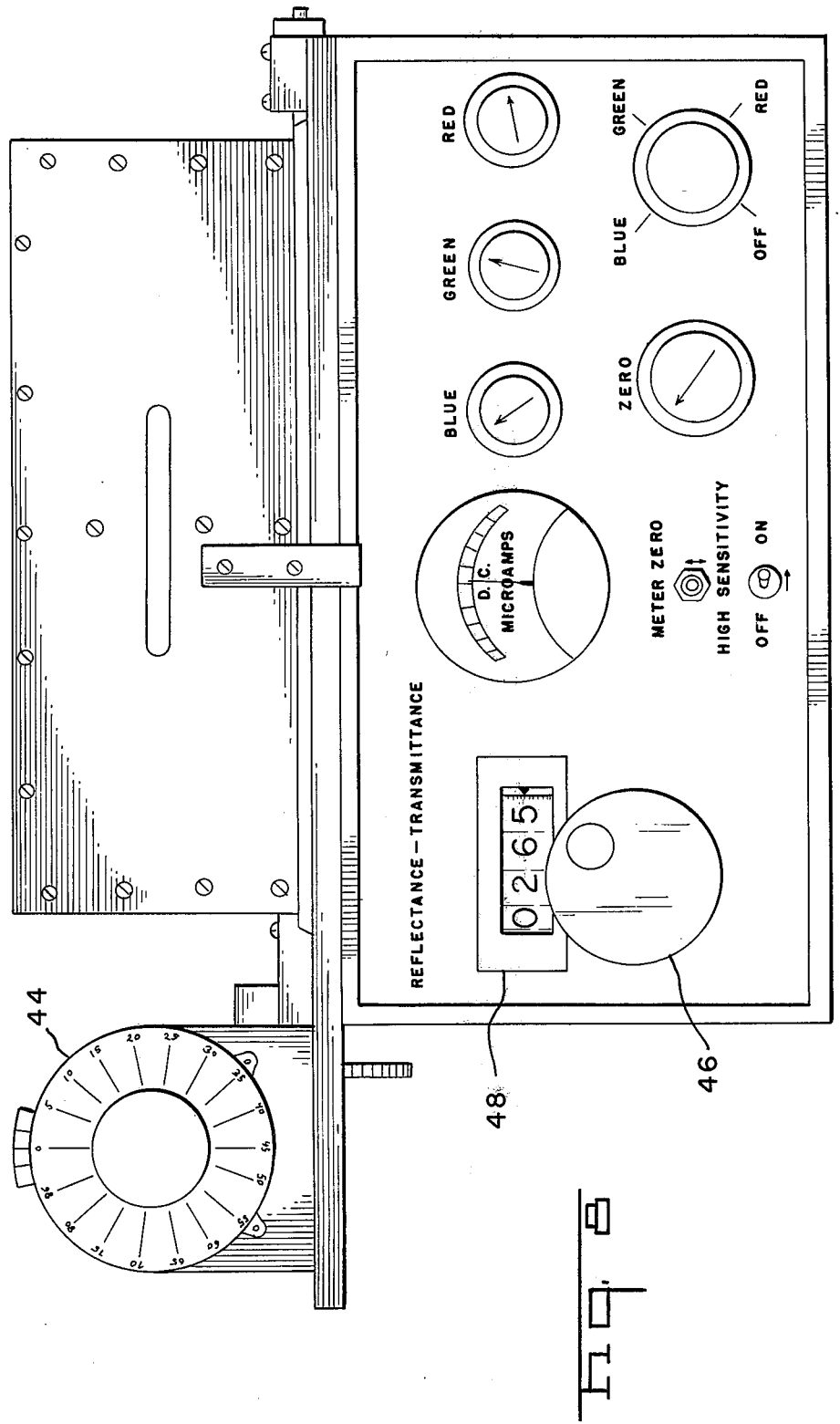

COLOR MATCHING SURFACE COATINGS CONTAINING METALLIC PIGMENTS

BACKGROUND OF THE INVENTION

This invention relates to methods of and apparatus for color matching coatings containing metallic flake like pigments.

There is a demand in the coatings industry for a technique to formulate and control the color effects of metallic colors. paints containing metallic pigments produce color effects which are attractive to the consumer. Chief among these are a metallic glitter and a deepening of the color when the angle of view is changed from perpendicular to the surface to an acute angle. These effects are due to the reflection of the light by the metallic flakes which usually lie relatively flat in the plane of the surface. The overall color observed is due primarily to the light diffusing pigments which absorb light in different amounts over the visible spectrum and which provide the more or less constant color background of the surface. Two types of light flux leave the surface of a film containing a mixture of diffusing and reflecting pigments. One light flux is diffuse and is due to the diffusing pigments, while the second type of flux, due to the metallic flakes, has an angle of view dependence which is related to the angle of incidence and the angular distribution of the metallic flakes relative to the surface. Hereafter, this second type of flux will be called angular flux.

Presently used techniques for matching metallic colors utilize highly skilled specialists called "shaders". The use of such specialists entails substantial man power costs and often leads to long delays in production when the shader is unable to arrive at a color match.

While the theoretical basis for color matching has long been known, widespread application of the theory was not put into use until the high speed digital computer became available to perform the required calculations. U.S. Pat. No. 3,601,589 McCarty shows an example of a color matching process.

"Color in Business, Science, and Industry," Judd and Wyszecko, Wiley, New York (1967) contains a description of what is commonly referred to as the Kubelka-Munk Theory.

Kubelka and Munk showed that, for thin films, the fraction of the incident light reflected was related to the relative ability of the pigments to absorb and scatter light as given by equation (1).

$$R' = \frac{S}{L + \sqrt{L^2 - S^2}} \quad (1)$$

where
$R'$ = the fraction of the incident light that is reflected from the film neglecting reflection at the air-coating vehicle interface
$S$ = the scatter constant of the pigment mixture
$K$ = the absorption constant of the pigment mixture
$L = K + S$ The pigment constants, K and S, for the pigment mixture are defined as the weight fraction weighted sum of the individual pigments making up the mixture. Thus, $$K = \sum_{i=1}^{N} C_i K_i \quad (2a)$$

$$S = \sum_{i=1}^{N} C_i S_i \quad (2b)$$

where
$C_i$ = the weight fraction of the ith pigment
$N$ = the number of pigments in the mixture.

An additional factor to be considered, is the reflection that takes place at the air-vehicle interface both as the light enters the film, and again as the reflected light leaves the film. In practice, reflection of the entering flux is generally taken care of by instrument design.

Reflection of light leaving the film results in a loss of flux which is a function of the index of refraction of the vehicle system and the angle of incidence.

A relationship between R' and the reflectance is given by equation (3).

$$R = \frac{\beta R' - \alpha}{1 + \gamma R'} \quad (3)$$

where
$R'$ = the reflectance exclusive of interface losses
$R$ = the reflectance
$\alpha, \beta, \gamma$ = constants which are functions of the refractive index difference between the vehicle system and air The above described techniques do not take into account the angular light flux which is dependent upon the angle at which a coating containing metallic pigments is viewed.

SUMMARY OF THE INVENTION

In accordance with this invention a method of and apparatus for color matching metallic pigment coatings are provided. In carrying out the invention a plaque carrying a standard coating is rotated in a colorimeter to measure the tri-stimulus coordinates of the coating at a plurality of different angles with respect to the surface of the plaque. The total reflectance of the coating is measured in a spectrophotometer. From the measured total reflectance and the measured tri-stimulus coordinates, the measured diffuse and angular reflectance of the standard coating is determined. A model which relates the diffuse and angular reflectance of a metallic paint coating to the concentration of pigments in the coating is generated in an automatic processing system.

In a formulation procedure the concentrations in the model are varied to obtain a least squares fit between the measured and predicted diffuse and angular reflectances of the paint.

In a shading procedure, a sample batch of paint with pigment concentrations determined from the formulation procedure is prepared. A plague prepared from this sample is rotated in the colorimeter to measure the tri-stimulus coordinates of the sample coating at a plurality of different viewing angles. The differences between the measured tri-stimulus coordinates of the standard and the measured tri-stimulus coordinates of the sample are obtained. The concentrations in the model are varied to minimize the sum of the square of the differences between the standard coordinates. The procedure is repeated with subsequent sample plaques to obtain the best match possible.

While the formulation and shading procedures are described as being performed serially, each procedure is independently useful and may be performed separately.

The foregoing and other objects, features and advantages of the invention will be better understood from the following more detailed description and appended claims.

DESCRIPTION OF THE DRAWINGS

FIGS. 6, 7 and 8 are side, top, and front views respectively of the colorimeter.

DESCRIPTION OF A PARTICULAR EMBODIMENT

Figure 2:
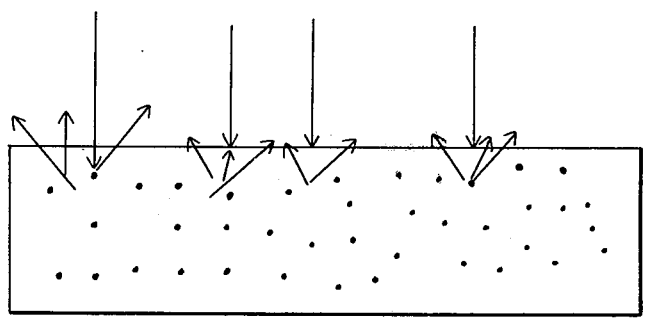
FIG. 2 depicts light incident upon a coating containing only light diffusing pigments.
Figure 3:
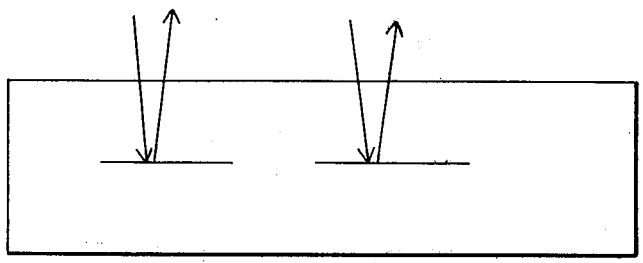
FIG. 3 depicts light incident upon a coating containing a metallic pigment.

Consider first the difference between the reflecting characteristics of paint coatings having only diffusing pigments as shown in FIG. 2 and those which include metallic pigments as depicted in FIG. 3. The diffusing pigments reflect light which is fairly uniform as a function of viewing angle. However, the paint containing metallic flake pigments, reflects light which changes in intensity of flux as a function of viewing angle. The procedure for color matching such a metallic pigment containing paint will be described as an improvement on the paint matching techniques described in aforementioned U.S. Pat. No. 3,601,589. The digital computer generated model of that patent provides only for the diffuse flux reflected from the standard whereas the model used in the present invention is a two-flux model which accounts for angular flux as well as diffuse flux. In addition, the present invention requires measurement of the light flux reflected from a coating at different viewing angles in order to measure the angular reflectance of the coating and in order to obtain tri-stimulus coordinates at different angles.

Figure 4:
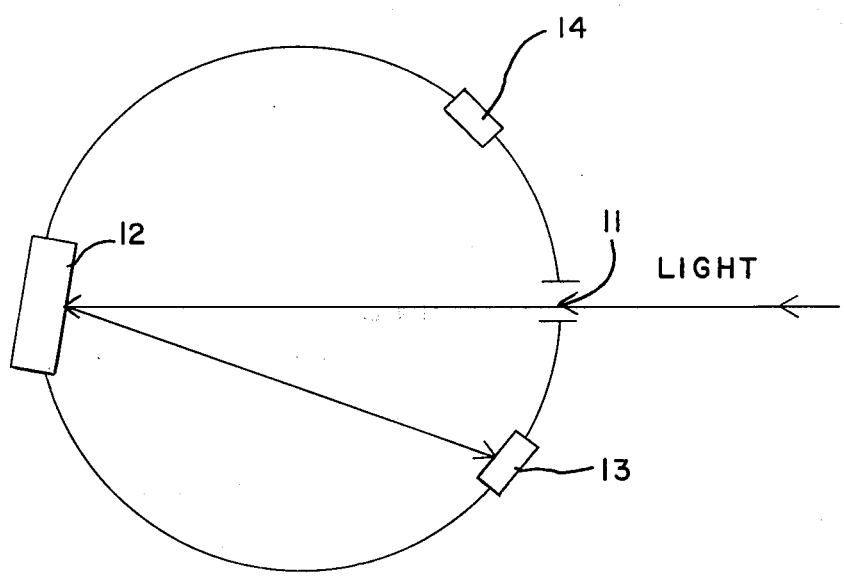
FIG. 4 depicts the spectrophotometer.

As in the previous patent, the matching procedure requires the measurement of the total reflectance in a spectrophotometer of the type shown in FIG. 4. Such a spectrophotometer includes a generally closed sphere having white inner walls. The light to be measured enters through a port 11 and is incident upon the paint coating 12. The light which is reflected from the surface of the coating is absorbed by a black panel 13. The remaining light, reflected from the paint pigments, is repeatedly reflected from the white walls of the spectrophotometer and ultimately all of the reflected light is measured by the photocell 14. In this manner, the total reflectance $R(\lambda)$ is measured. In one actual embodiment of the invention a Bausch and Lomb Spectronic 505 was used. Thirty-one reflectance measurements were taken at 10 nanometer intervals between 400 and 700 nanometers. The total reflectance is given by:

$$R = \int_{400}^{700} R(\lambda)\, d\lambda$$

Figure 5:
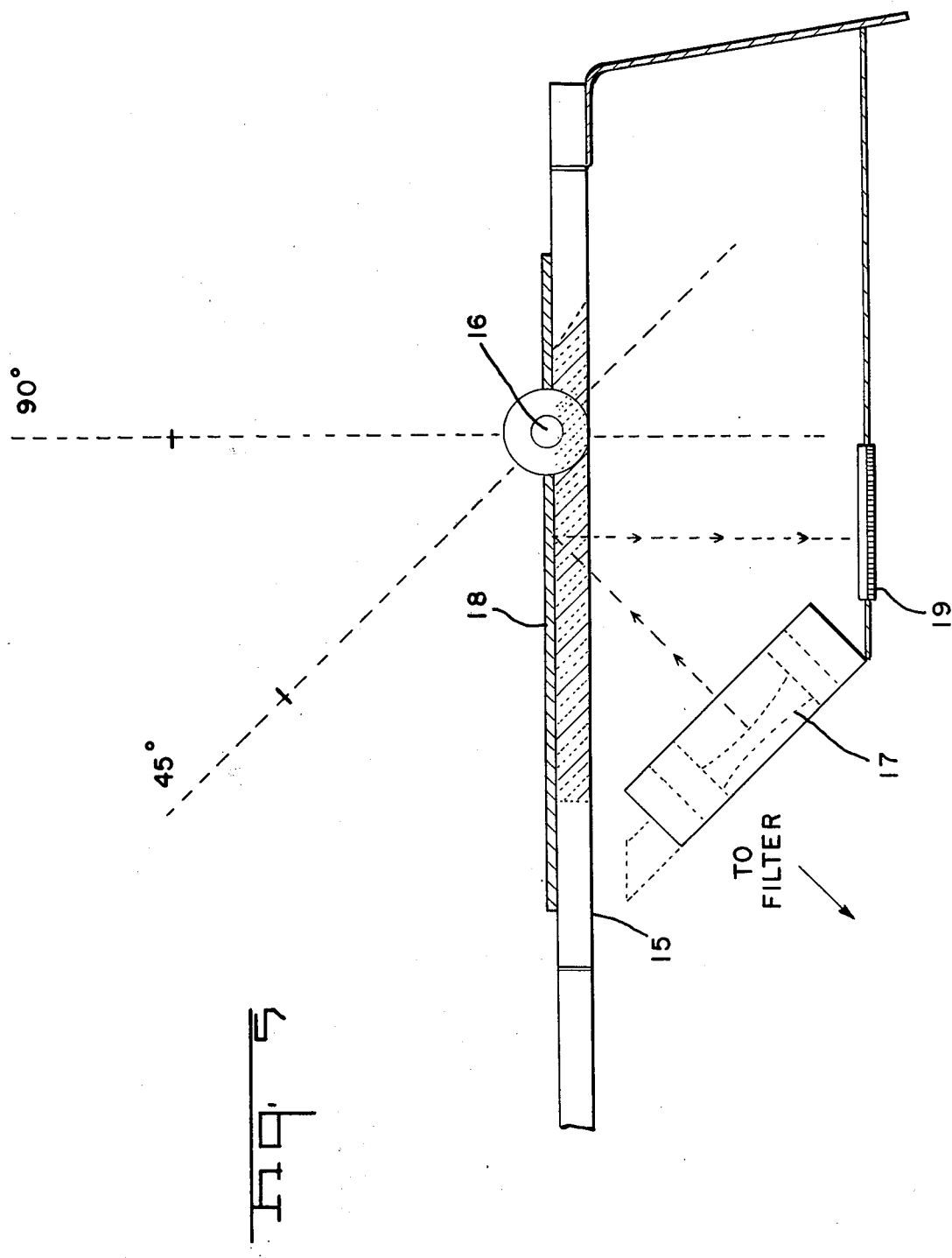
FIG. 5 depicts the colorimeter.

The colorimeter which measures tri-stimulus coordinates at different viewing angles is depicted in FIG. 5 and will later be described in more detail with reference to FIGS. 6–8. The colorimeter includes a hinged holder 15 which is pivoted at the point 16. Light from a source which includes the lens 17 passes through an aperture in the holder 15. The light is reflected from the coating on the plaque 18. The reflected light is measured by a photocell 19. The colorimeter has blue, red and green filters between the light source and plaque, so that the photocell 19 measures the reflecting characteristics of the coating to red, green and blue light. The responses to each of these three lights are referred to as the tri-stimulus coordinates of the surface coating. The holder 15 can be rotated so that these tri-stimulus coordinates can be measured at a plurality of different viewing angles. In the embodiment shown the holder rotates between the position shown and the 90° position.

Figure 1:
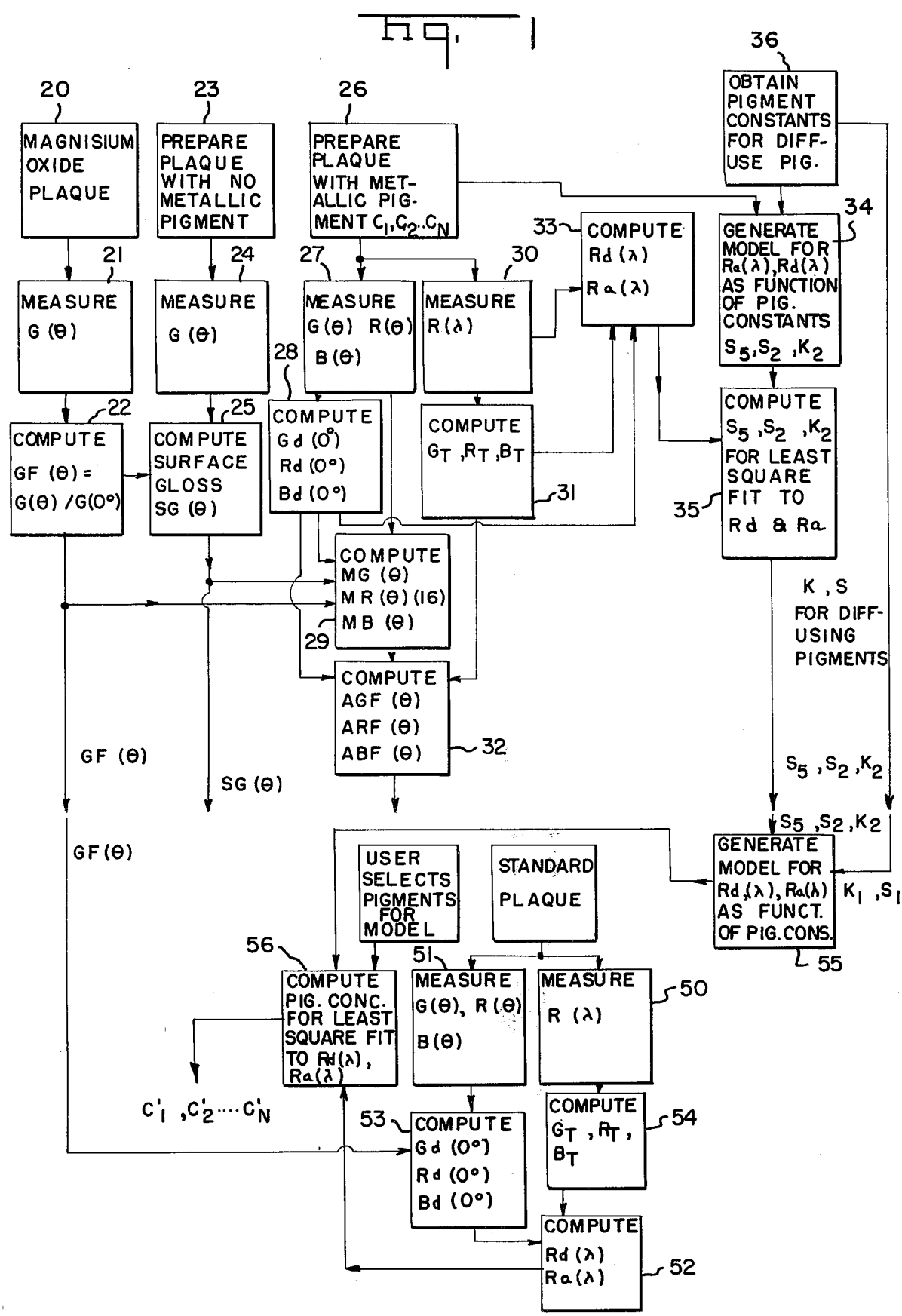
FIGS. 1 and 1A are a flow sheets depicting the process of this invention.

The Calibration Procedure, FIG. 1

There are three somewhat distinct procedures involved in this invention: calibration, formulation and shading. The principles are very similar and are described in the section entitled THEORY. In this description of the flow sheets, reference will be made to certain equations which are given and explained in the THEORY section.

Figure 1A:
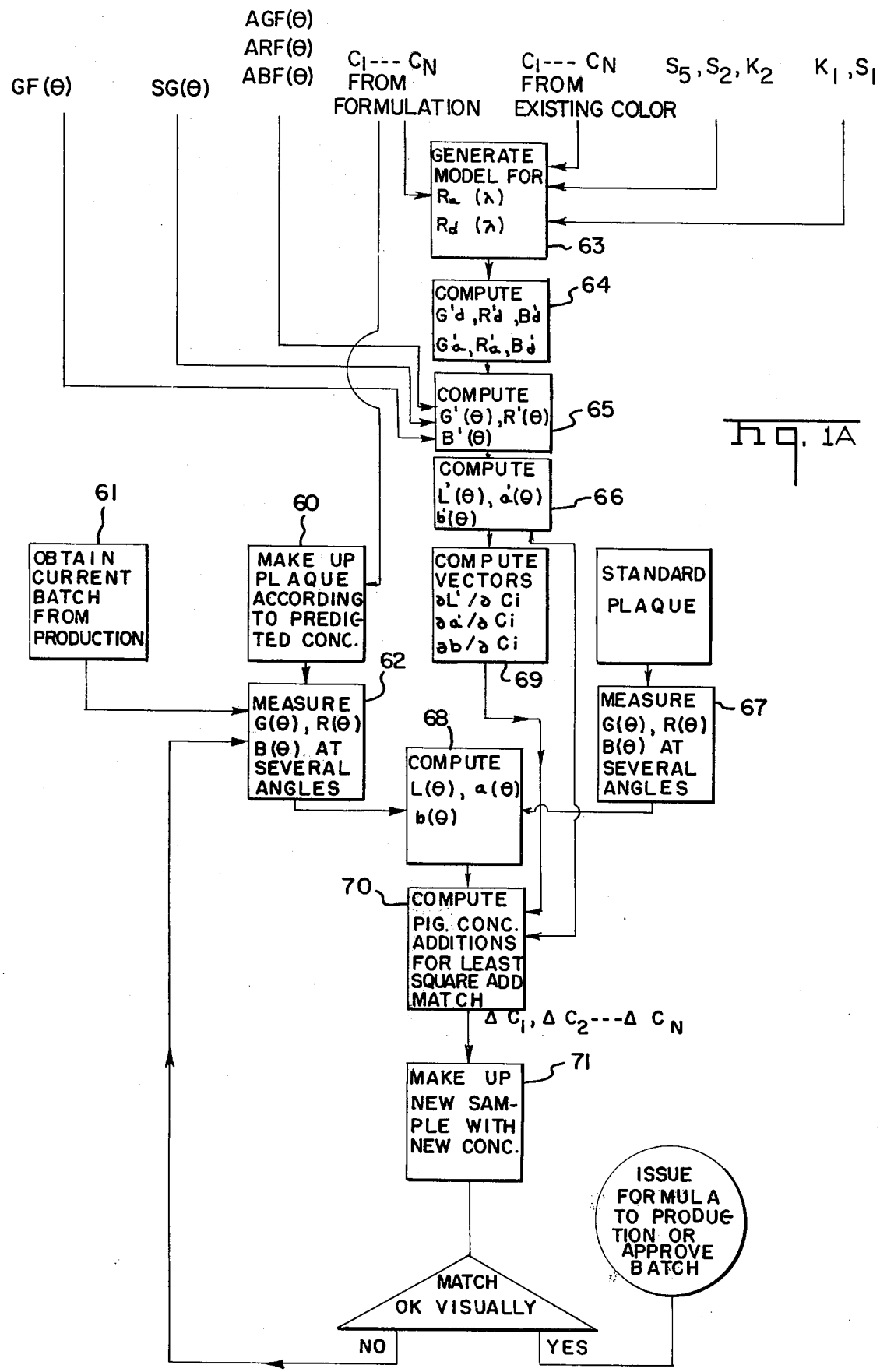

FIG. 1A depicts the generation of geometric factors, angular factors, surface gloss, and coefficients which are generated only once for each pigment.

The geometric factor is determined from a light diffusing magnesium oxide plaque 20. The magnesium oxide plaque is placed in the colorimeter and readings are taken at various angles as indicated by the step 21. The geometric factor $GF(\theta)$ is computed in accordance with equation (15a) as indicated by the step 22 in the flow sheet.

In order to measure the surface gloss, plaques are prepared with no metallic pigments as indicated by the step 23. These plaques are placed in the colorimeter and measurements are taken at various angles. This step is indicated at 24 in the flow sheet. From these measurements, and from the computed geometric factor from step 22, the surface gloss can be determined as indicated in the step 25. This determination is made in accordance with equation (15).

In order to determine the metallic angular factors, plaques are prepared with metallic pigments as indicated at 26. These are placed in the colorimeter and measurements are made as indicated at 27. From these measurements, the estimated diffuse G, R and B values can be determined as indicated at 28. This computation is made in accordance with equation (16a) and similar equations for the R and B values. From these values, and from the geometric factor $GF(\theta)$ from step 22, and from the surface gloss from step 25, the metallic angular G values are computed as indicated by step 29. This computation is in accordance with equation (16).

The plaques with the metallic pigment are also placed in the spectrophotometer as indicated in the step 30. From the total reflectance, values of $G_T$, $R_T$ and $B_T$ are generated as indicated at 31. This is in accordance with equation (17a) and similar equations for $R_T$ and $B_T$.

The results of steps 28, 29 and 31 are used in the generation of the angular factors. This step is indicated at 32 and is in accordance with equation (17).

From the factors determined thus far, the diffuse and angular reflectance $R_d(\lambda)$ and $R_a(\lambda)$ can be generated as indicated at 33. This computation is made in accordance with equation (18).

A model is generated relating $R_a(\lambda)$ and $R_d(\lambda)$ to the pigment constants $S_5$, $S_2$ and $K_2$. The generation of this model is indicated at 34. The model is fitted to the computed angular and diffuse reflectance to determine $S_5$, $S_2$ and $K_2$ by least square fitting, this step being indicated at 35. These coefficients are outputs from this procedure. Also provided as outputs are the coefficients $K_1$ and $S_1$ which are coefficients for diffusing pigments. These are obtained in accordance with the procedure given in U.S. Pat. No. 3,601,589, the step being indicated at 36 in the flow sheet.

The Formulation Procedure,

Referring now to the flow sheet of the color matching method of this invention shown in FIG. 1, the step 50 indicates the measurement of the total reflectance of a standard coating which is to be matched. This step is performed in a spectrophotometer of the type depicted in FIG. 4. The step 51 is the measurement of the tri-stimulus coordinates of the standard at different viewing angles. This step is performed on a colorimeter of the type depicted in FIG. 5. The measured tri-stimulus coordinates are denoted $G(\theta)$, $B(\theta)$ and $R(\theta)$. From the measured total reflectance and from the measured tri-stimulus coordinates, the measured diffuse and angular reflectance can be determined as indicated by the step 52. As intermediate steps, the values of $G_d(0°)$, $R_d(0°)$ and $B_d(0°)$ are determined from equation (16) as indicated by the step 53. Also, $G_T$, $R_T$ and $B_T$ are computed from equation (17a) and similar equations as indicated by the step 54. Now diffuse and angular reflectance can be computed.

The diffuse reflectance is related to the measurements from the spectrophotometer and from the colorimeter by the following:

the step 55. A model relates angular and diffuse reflectance to the paint pigment concentrations. As will be explained more fully in the section entitled THEORY, the model is simplified so that the model actually used is given by:

$$R' = \frac{S_{14}}{A + L_{1245}} + \frac{S_{124}S_5}{(A + L_{1245})(A + L_{124})} + \frac{S_2}{L_{1245}} \quad (11)$$

where $$A = \sqrt{L_{124}^2 - S_{124}^2}$$

Having obtained the measured angular and diffuse reflectance $R_a$ and $R_d$ and the predicted angular and diffuse reflectances $R_a'$ and $R_d'$ from the model, the differences between these reflectances can be obtained. Then the concentrations in the model are varied so as to minimize this difference. This step is indicated at 56 in the flow sheet. A least square difference procedure is used. The result is a set of concentrations of paint pigments. As an example, a batch is made from seven paint pigments. Therefore, the outputs of the step 56 are predicted concentrations $C_1$, $C_2$...$C_7$ for the seven paint pigments. This is the end of the formulation procedure. In order to get a better match, a procedure referred to as shading is used.

The Shading Procedure, FIG. 1A

As a first step in the shading procedure a plaque is made up in accordance with the concentrations predicted from the foregoing formulation procedure. This step is indicated at 60. Alternatively, a plaque can be prepared from a current batch from production. This step is indicated at 61. In either case it is important to obtain reproducible results. In order to obtain repro- $$R_d(\lambda) = \frac{R(\lambda)}{S(\lambda)} \left[ \frac{G_d(0°)H_y(\lambda)}{G_T} + \frac{1.275 R_d(0°)[H_x(\lambda) - .166 H_z(\lambda)]}{R_T} + \frac{.8467 B_d(0°)H_z(\lambda)}{B_T} \right] \quad (18)$$

Where
$S(\lambda) = H_y(\lambda) + 1.275[H_x(\lambda) - 0.166 H_z(\lambda)] + 0.8467 H_z(\lambda)$ $R(\lambda)$ = the total reflectance as measured on the spectrophotometer. $H_y(\lambda)$, $H_x(\lambda)$ and $H_z(\lambda)$ are the tri-stimulus values of the standard observer. $G_d(0°)$, $R_d(0°)$, $B_d(0°)$ are the measured tri-stimulus coordinates at a viewing angle of 0°, and $G_T$, $R_T$ and $B_T$ are the spectrometer reflectance readings integrated with respect to standard tri-stimulus values. The development of and the theory of the above relationship and other relationships used in this procedure will be explained more fully under the section of this specification entitled THEORY.

The angular total reflectance $R_a$ is the difference between the total reflectance $R(\lambda)$ as measured on the spectrophotometer and the diffuse reflectance $R_d$. Therefore, the output of the step 52 is measured angular and diffuse reflectance $R_a$ and $R_d$.

Predicted values of angular and diffuse reflectance, $R_a'$ and $R_b'$ are generated from a model as indicated by ducible results, the paint spraying procedure used in preparing a panel with a coating is quite important. The spray booth used in this work was a standard DeVilbiss spray booth model DV-6210. The spray equipment is a standard Dial-o-matic spray unit equipped with a JGA-502-30 EX Spray gun.

The environmental control unit was designed specifically to control the temperature of the air in the immediate vicinity of the panel while the paint is being applied. The heating unit is a Conrad-Missimers model PITC-100 X400-CO2 Plug in temperature conditioner. Air is drawn into the air chamber and heated to a given temperature, and then forced out through the baffles which are situated within 1 inch of the panel holder.

The necessity of this procedure is to insure reproducibility, from panel to panel, of the spray pattern.

The sample panel is placed in the colorimeter and the tri-stimulus coordinates are measured at different viewing angles. This step is indicated at 62 in the flow sheet and the outputs are the tri-stimulus coordinates $G(\theta)$, $B(\theta)$ and $R(\theta)$.

The model is used to compute the predicted tri-stimulus coordinates at different viewing angles. The generation of the model is indicated at 63 in the flow sheet. From the predicted angular and diffuse reflectances, $R_a'(\lambda)$ and $R_d'(\lambda)$ the values of $G_d'$ and $G_a'$ are computed in accordance with equations (22a) and (22b). Similar equations are used to compute $B_d'$, $B_a'$, $R_a'$ and $R_d'$. This step is indicated at 64 in the flow sheet.

Predicted tri-stimulus coordinates are computed as indicated at 65 in the flow sheet. These are computed in accordance with equation (22). The surface gloss and the geometric factors, $SG(\theta)$, $GF(\theta)$, $AGF(\theta)$, $ARF(\theta)$ and $ABF(\theta)$ are inputs to this computation and they are obtained from the calibration procedure of FIG. 1A.

The predicted tri-stimulus coordinates are converted to cube root coordinates as indicated by the step 66.

The values of $G(\theta)$, $R(\theta)$ and $B(\theta)$ for the standard being matched are measured as indicated at 67. The measured tri-stimulus coordinates for both the made up and standard plaque are converted to cube root coordinates as indicated by the step 68.

Cube root color coordinates are more uniform visually than are G, R, and B. They are defined as:

$$L = 25.29 \ G^{1/3} - 18.38 \quad (19)$$

$$a = 106 \ [(0.8R + 0.2B)^{1/3} - G^{1/3}] \quad (20)$$

$$b = 42.34 \ [G^{1/3} - B^{1/3}] \quad (21)$$

Substitution of $G'(\theta)$, $R'(\theta)$ and $B'(\theta)$ into the above equations give $L'(\theta)$, $a'(\theta)$ and $b'(\theta)$, which are the corresponding L, a, b color coordinates as a function of angle of view.

The ratio of the change in color coordinates to the change in each pigment concentration is a numerical approximation to the first partial derivatives of the color coordinates as a function of pigment concentration. The partial derivatives are referred to as vectors and their generation is indicated at 69 in the flow sheet.

The difference between the predicted and the measured color coordinates is obtained as indicated at 70. The sum of the squared difference is denoted $\Delta E$. Utilizing the concept of least squares to minimize $\Delta E$, new predicted pigment concentration additions can be obtained to give the best color match. Equations (23)-(25) are used in step 70.

In the shading procedure these new predicted concentrations are used to prepare a new sample as indicated at 71. A visual determination is made as to whether the new sample matches the standard. If it does not, steps 62, 68, 70 and 71 are repeated. Ultimately, a sample will be produced which most nearly provides a good color match with the standard.

The Colorimeter

Figure 6:
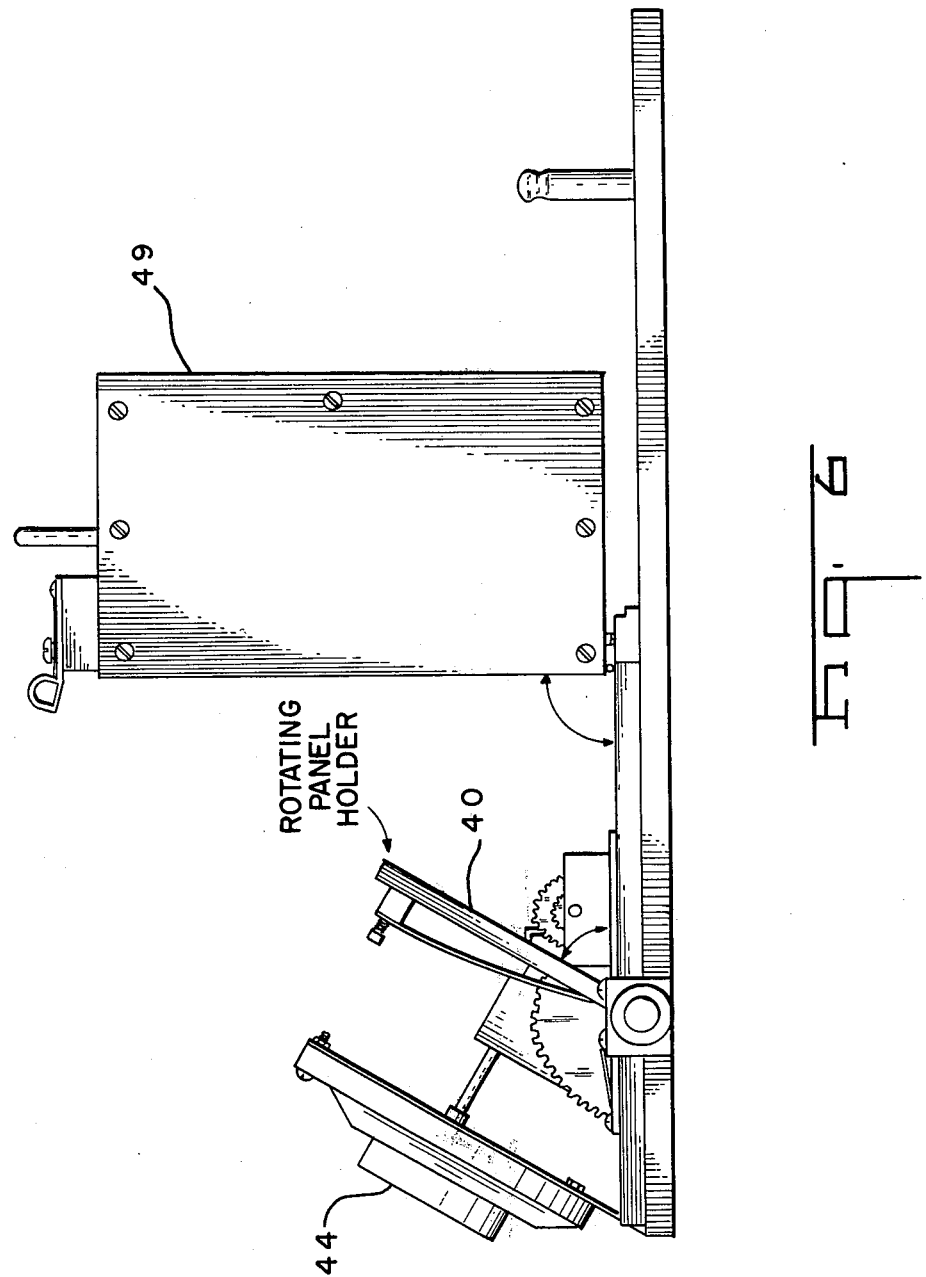
Figure 7:
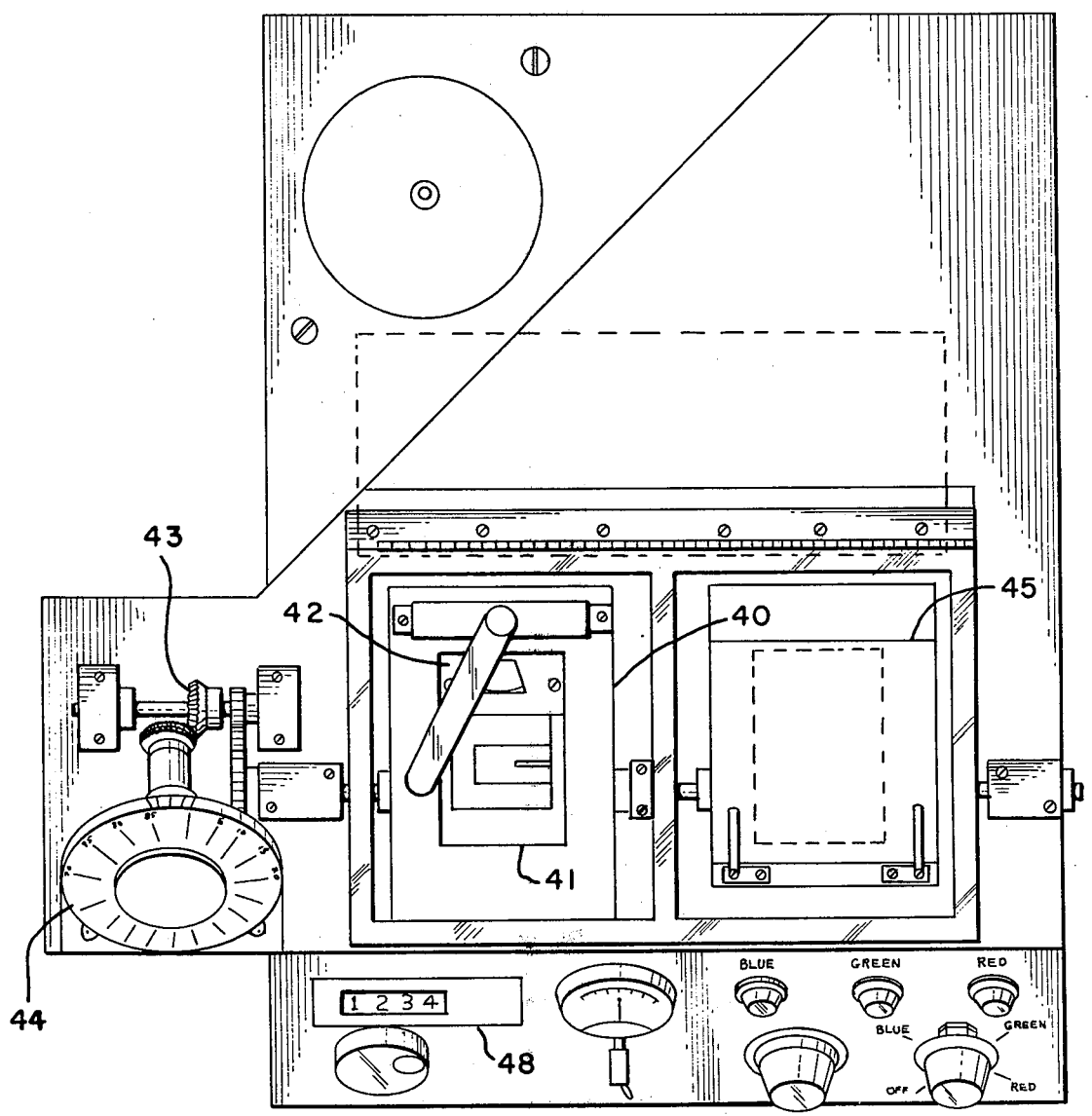

Referring now to FIGS. 6-8, the colorimeter is a modified "Color Master, Mark V" tri-stimulus colorimeter manufactured by Meeco. The instrument includes a rotating panel holder 40 which has a viewing aperture 41. The sample plaque is held on the rotating holder by a spring clip 42. The plaque holder is rotated by gear train 43 connected to the knob-dial 44. By rotating the knob-dial the desired viewing angle of the plaque with respect to the light source and photocell is obtained.

A box type cover 49 eliminates outside light which might otherwise fall on the photocell when the panel is rotated.

The photocell, light source and electronics are not shown in the Figures. They may be a standard type such as that provided in the aforementioned Color Master, Mark V tri-stimulus colorimeter. In this colorimeter the light from a source is split. Part of the light is reflected from the plaque on the rotating holder 40 and part of the light is reflected from a standard plaque 45. The percent of light split between the sample and the standard plaque is adjusted by the adjusting knob 46. When the light reflected from the two surfaces is equal, the meter registers a null. At this point, the indicator 48 which is adjusted by the knob 46, indicates reflectance directly.

Three readings are taken to specify the color at any given angle. Each one of these three readings represent the percentage of light reflected from the panel after passing through the red, green or blue filter. In one actual embodiment, 18 readings were taken at 5° intervals between 0° and 85°. With the exception of the modifications just described, the apparatus used in carrying out this invention is that in FIGS. 2 and 3 of U.S. Pat. No. 3,601,589 and that disclosure is specifically incorporated herein by reference.

Theory

The model is based on the two flux concept as outlined previously. For simplicity these two flux are called diffuse and angular.

Assume that the light flux is unidirectional, monochromatic, and nearly normal to the surface. Also assume that the film is very thin relative to the surface area, so that any light escaping from the edge of the film can be neglected.

Define $S_1$ = the back scatter constant of the diffusing pigments $K_1$ = the absorption constant of the diffusing pigments $S_2$, $K_2$ = metallic reflectance and absorption constant in the angular flux $S_3$, $K_3$ = metallic reflectance and absorption constant in the diffuse flux $S_4$ = diffuse backscatter and diffuse back reflectance of the metallic pigment in the angular flux $S_5$ = forward scatter constant of the diffusing pigments $S_6$ = forward scatter constant of the metallic flake pigments In these definitions the concept of forward scatter is novel to color theory and is essential in explaining the behaviour of angular-diffuse pigment mixtures.

In addition, the metallic flake pigment scatters and reflects light diffusely as well as reflecting light spectrally. This is required because of the irregular nature of the surface of metallic flake pigments and the presence of fines in the normal commercial metallic pigments. If this metallic surface is sufficiently irregular, even though the light may be reflected, the net effect of the reflectance will be to destroy the initial directional character of the input flux and produce an essentially diffuse reflected beam.

In addition, it should be noted that once the flux is converted from unidirectional to diffuse, it will remain diffuse. That is, reflectance of diffuse radiation will be diffuse also.

In the model the metallic pigment has different constants in the diffuse and angular beams as indicated by subscripts 2 and 3. This is due to the different geometry of the input light to the metallic flakes. Thus, an element of diffuse radiation approaching the end of a metallic flake "sees" a small particle, whereas light approaching normal to the surface of the flake sees a much larger particle.

It is assumed that when the input beam is reflected by a metallic flake, then no metallic particle lies between that particle and the surface of the film. This should be true if the input beam is normal to the surface, and the metallic flake is parallel to the surface.

With these definitions and assumptions, the differential equations describing the general thin film-two flux model are:

$$\frac{di_d}{dx} = -(K_1+S_1+K_3+S_3)i_d + (S_1+S_3)j_d + (S_5+S_6)i_a + S_1J_a \quad (4)$$

$$\frac{dj_d}{dx} = (K_1+S_1+K_3+S_3)j_d - (S_1+S_3)i_d - (S_1+S_4)i_a - S_5j_a \quad (5)$$

$$\frac{di_a}{dx} = -(K_1+S_1+K_2+S_2+S_4+S_5+S_6)i_a \quad (6)$$

$$\frac{dj_a}{dx} = -S_2i_a + (K_1+S_1+S_5)j_a \quad (7)$$

where
$i$ = flux traveling toward the substrate
$j$ = flux traveling toward the surface of the film
and
subscripts $d$ and $a$ refer to the diffuse and angular beams respectively, and
$x$ = the linear dimension of thickness as measured from the surface of the film in the direction of the substrate Given the boundary conditions $i_d = 0$ At $x = 0$ $i_a = i_a$ At $x = 0$ and that the limit of $j_a$ and $j_d$ is 0 as $x \rightarrow \infty$, then the solution of equation (4) through (7) is given by equations (8) through (10).

$$R_d' = \frac{S_{14}}{a + L_{12456}} + \frac{S_3 S_{56}}{(a + L_{12456})(a + L_{13})}$$

$$+ \frac{S_2 S_5}{(L_{15} + L_{12456})(a + L_{12456})}$$

$$+ \frac{S_1 S_2 S_{13}}{(a + L_{13})(a + L_{12456})(L_{15} + L_{12456})} \quad (8)$$

$$R_2' = \frac{S_2}{L_{15} + L_{1245}} \quad (9)$$

$$R_T' = R_d' + R_a' \quad (10)$$

where
$R_T'$ = the ratio of total exit flux to total input flux, i.e., the total reflectance
$R_a'$ = the ratio of angular flux leaving to total input flux, i.e., the metallic reflectance
$R_d'$ = the ratio of diffuse flux leaving the surface to total input flux, i.e., the diffuse reflectance
$a = \sqrt{L_{13}^2 - S_{13}^2}$ Subscripted parameters represent summations as follows:

$L$ = the sum of K+S over the subscripts indicated
$S$ = the sum of S over the subscripts indicated
Thus
$L_{13} = K_1 + S_1 + K_3 + S_3$
and
$S_{14} = S_1 + S_4$
and
$L_{15} = K_1 + S_1 + S_5$ As in the KUBELKA-MUNK model, all parameters are understood to represent the weight fraction weighted sum of all pigments in the mixture. For example:

$$K_1 = \sum_{i=1}^{N} C_i K_{1i}$$

$$S_2 = \sum_{i=1}^{M} C_i S_{2i}$$

where
$N$ = the number of diffusing pigments in the mixture
$M$ = the number of metallic pigments in the mixture The model for total reflectance contains five terms. This means that considerably more computation will be required to compute the reflectance via this model as compared to the KUBELKA-MUNK model.

In order to reduce the number of parameters and the number of terms, several simplifying assumptions were made.

First, $S_6$ was assumed to be zero, and $S_3$ was set equal to $S_2 + S_4$ and $K_3$ was set equal to $K_2$. Thus, any diffuse forward scatter of the input beam by the metallic flake is neglected, and the absorption-reflection behaviour of the metallic is assumed to be the same in either the diffuse or angular beam.

Secondly, it was assumed that the reflected angular beam, $j_a$, will pass out of the film without interacting with the diffusing pigments. These assumptions reduce the model to three terms, as given by equation (11):

$$R_T' = \frac{S_{14}}{A + L_{1245}} + \frac{S_{124} S_5}{(A + L_{1245})(A + L_{124})}$$

$$+ \frac{S_2}{L_{1245}} \quad (11)$$

where $R_d'$ is the first two terms on the right side of the equation and $R_a'$ is the third term, and where $$A = \sqrt{L_{124}^2 - S_{124}^2}$$

Equation (11) is sufficient to correlate the behaviour of metallic pigments.

The diffuse reflectance $R_d'$ is corrected for internal reflectance by use of equation (3).

INTEGRATION OF EXPERIMENT AND THEORY

In this section the important concepts required to relate the experimental data and the theory will be described.

A. Spectrophotometric Data

The incident light flux is essentially unidirectional, monochromatic, and normal to the surface. The reflected light is collected by an integrating sphere surrounding the sample and the reflectance is measured by means of a photocell. Thus the measured reflectance is the sum of the diffuse and angular reflectances.

Measurements are made between 400 and 700 millimicron wave lengths at 10 millimicron intervals, resulting in 31 measurements of total reflectance.

B. Colorimeter Data and Calculations

The colorimeter measures the product of reflectance and tristimulus values, integrated over the 400 to 700 millimicron region of the spectra. Since there are three tristimulus values at each wavelength, the measurement is made three times, once for each tristimulus value.

With the modifications described previously, measurements may be made at any setting angle between 0° and 90°.

In this study measurements were made at 5° intervals, so that 18 readings were taken for each tri-stimulus value.

At the 0° setting the light is incident at 45° while the viewing photocell is normal to the surface. As the panel is rotated from 0° to 90°, the angle of incidence varies ± 45° about the surface normal, while viewing varies from 0° to very nearly 90°.

The colorimeter is designed to provide Green, G, Red, R, and Blue, B, readings which are defined as:

$$G(\theta) = \int_{\lambda=400}^{\lambda=700} R(\lambda,\theta)H_y(\lambda)d\lambda \quad (12)$$

$$R(\theta) = \int_{\lambda=400}^{\lambda=700} R(\lambda,\theta)[1.275(H_x(\lambda) - .166H_z(\lambda))]d\lambda \quad (13)$$

$$B(\theta) = \int_{\lambda=400}^{\lambda=700} R(\lambda,\theta)H_z(\lambda)d\lambda \quad (14)$$

where
$\theta$ = Angular setting
$\lambda$ = Wave length
$R(\lambda,\theta)$ = The total surface reflectance in air as a function of viewing angle
$H_{x,y,z}(\lambda)$ = The tri-stimulus values of the standard observer.

At 0°, these three readings will be essentially the same as the integrated spectrophotometric curves, for a film containing diffusing pigments.

For a glossy surface the reading passes through a maximum as the plaque is rotated from 0° to 90°. This is due to the fact that the photocell "sees" the surface gloss as well as the diffuse reflectance. At 0° all surface gloss is absorbed by the "Black" interior walls of the colorimeter, while at about 22½°, the angle of incidence is approximately equal to the angle of view and the observed gloss is maximized. Since gloss is a function of the refractive index difference between the vehicle system and air, the surface gloss portion of the reading will be the same, regardless of the color of the film.

Thus, subtracting the product of the 0° reading times a geometric factor from the reading at each angle will provide a measurement of surface gloss as a function of viewing angle. This procedure is mathematically defined by equation (15).

$$SG(\theta) = G(\theta) - G(0°) \, GF(\theta) \quad (15)$$

where
$SG(\theta)$ = the surface gloss as a function of angle
$G(\theta)$ = the G (Green) reading
$G(0°)$ = the G reading at 0°
$GF(\theta)$ = the Geometric Factor The geometric factor is determined by measuring $G(\theta)$ at various angles using a light diffusing Magnesium Oxide plaque and computing as $$GF(\theta) = \frac{G(\theta)}{G(0°)} \quad (15a)$$

Glossy films containing metallic pigments exhibit a maximum that rises much higher above the 0° reading than do films containing diffusing pigments only. This is due to the reflectance of the metallic particles which tend to lie relatively flat and parallel to the surface.

The instrument reads the sum of the flux due to the diffuse reflectance, the surface gloss, and the metallic reflectance. Since the 0° reading is not pure diffuse radiation, the metallic reflectance cannot be obtained in the same manner as surface gloss was obtained.

Instead, assume that the metallic reflectance is negligible when $\theta = 75$. The readings at 75°, 80°, and 85° are divided by the geometric factor to obtain three independent measures of the diffuse value at 0°. Taking the arithmetic average of these three estimates as the best estimate of the diffuse value at 0°, we can define the metallic angular G value as $$MG(\theta) = G(\theta) - G_d(0°) \, GF(\theta) - SG(\theta) \quad (16)$$

where
$MG(\theta)$ = the metallic angular G value
$G_d(0°)$ = the estimated diffuse G value at 0°

$$= \frac{1}{3}\left[\frac{G(75°)}{GF(75°)} + \frac{G(80°)}{GF(80°)} + \frac{G(85°)}{GF(85°)}\right] \quad (16a)$$

Similar equations can be written for the metallic angular R and B values.

C. Metallic Angular Factors

Metallic angular factors are defined as follows.

First the spectrophotometric data is integrated to give the total G, R, and B values of the film according to equations (12), (13), and (14).

Substracting the diffuse G, R, B values at 0° as estimated above from the total G, R, B values the overall metallic G, R, B values are obtained.

The metallic Angular Factors are defined as the ratio of the metallic angular G, R, or B values to the metallic G, R, B values.

The above procedure is given by equation (17) for the G Angular Factor. Similar equations are written for R and B angular factors.

$$AGF(\theta) = MG(\theta)/[G_T - G_d(0°)] \quad (17)$$

where $$G_T = \int_{\lambda=400}^{\lambda=700} R(\lambda) \, H_y(\lambda)d\lambda \quad (17a)$$

$R(\lambda)$ = The spectrophotometric reflectance readings
$AGF(\theta)$ = Angular Factor for G readings In this way, Angular Factors are computed for each metallic pigment of commercial interest. These factors do not depend on the type of diffusing pigment used, and depend only on the technique of panel preparation.

D. Decomposition of Total Reflectance into Diffuse and Metallic Components

The diffuse values of G, R, and B from panels containing metallic flake pigments are estimated from the colorimeter reading at 75°, 80°, and 85°; and total G, R, B values were computed from total reflectance.

Since these values represent tri-stimulus weighted sums of the diffuse and total reflectance over all wave lengths, the diffuse reflectance can be estimated at any wavelength by weighting the ratios of diffuse to total G, R, B value by the tri-stimulus values, as given by equation (18).

$$R_d(\lambda) = \frac{R(\lambda)}{S(\lambda)} \left[ \frac{G_d(0°)H_y(\lambda)}{G_T} + \frac{1.275R_d(0°)]H_x(\lambda)}{R_T} - .166H_z(\lambda) \right] + \frac{.8467B_d(0°)H_z}{B_T} \quad (18)$$

where $S(\lambda) = H_y(\lambda) + 1.275[H_x(\lambda) - 0.166H_z(\lambda)] + 0.8467H_z(\lambda)$ $R(\lambda)$ = the total reflectance as measured on a spectrophotometer This relationship is not precise, since there are not independent measurements at all 31 wavelengths. However, it should provide reasonably accurate estimates of diffuse reflectance at the three wavelengths corresponding to the tri-stimulus maxima and will provide a smooth curve connecting these three estimates.

The decomposition procedure described by equation (18) is used in the calculation of metallic pigment constants, and again when formulating metallic colors.

E. Shading Vectors in Cube Root Coordinates

Cube Root color coordinates are more uniform visually than are G, R and B. They are defined as:

$$L = 25.29 \, G^{1/3} - 18.38 \quad (19)$$

$$a = 106[(0.8R + 0.2B)^{1/3} - G^{1/3}] \quad (20)$$

$$b = 42.34 \, [G^{1/3} - B^{1/3}] \quad (21)$$

Given the model (equations 8, 9 and 10), the pigment concentrations and the pigment parameters, G, R, B can be computed for the diffuse and metallic reflectances via equations (12), (13) and (14).

The predicted colorimeter coordinates may be computed as a function of setting angle as given by equation (22) for the G reading:

$$G'(\theta) = (G'_d)(GF(\theta)) + (G'_a)(AGF(\theta)) + SG(\theta) \quad (22)$$

where $$G_d' = \int_{\lambda=400}^{\lambda=700} R_d'(\lambda)H_y(\lambda)d\lambda \quad (22a)$$

$$G_a' = \int_{\lambda=400}^{\lambda=700} R_a'(\lambda)H_y(\lambda)d\lambda \quad (22b)$$

Equation (22), and similar equations for the red and blue components $R'(\theta)$ and $B'(\theta)$ give the basic relationship between the model, the spectrophotometer, and the colorimeter.

Substitution of $G'(\theta)$, $R'(\theta)$, $B'(\theta)$ into equations (19), (20), and (21) give, $L'(\theta)$, $a'(\theta)$, and $b'(\theta)$, which are the corresponding L, a, b color coordinates as a function of angle of view.

By varying the pigment concentrations individually new values of $L'(\theta)$, $a'(\theta)$, and $b'(\theta)$ are computed. The ratio of the change in color coordinates to the change in each pigment concentration gives a numerical approximation to the first partial derivatives of the color coordinates as a function of pigment concentration. In practice, the partial derivatives are called "vectors."

Now assume that the color coordinates of the standard color and the color coordinates of the current batch are available. The difference between these two sets of color coordinates may be related to a change in pigment concentration through a Taylor Series expansion which contains only the first partial derivative. Thus, equations (23), (24) and (25) are approximately true depending on the distance in "color space" between the standard and current batch colors.

$$\Delta L(\theta_j) = \sum_{i=1}^{N} \frac{L'(\theta_j)}{C_i} \Delta C_i \, j = 1 \ldots m \quad (23)$$

$$\Delta a(\theta_j) = \sum_{i=1}^{N} \frac{a'(\theta_j)}{C_i} \Delta C_i \, j = 1 \ldots m \quad (24)$$

$$\Delta b(\theta_j) = \sum_{i=1}^{N} \frac{b'(\theta_j)}{C_i} \Delta C_i \, j = 1 \ldots m \quad (25)$$

where $m$ = the number of angles $N$ = the number of pigments $\Delta L, \Delta a, \Delta b$ = the Standard Color Coordinate minus Current Batch Color Coordinate for L, a and b respectively Designating the left hand side of the above equation set by an algebraic column vector $\vec{\Delta L}$, and the unknown concentrations by the column vector $\vec{\Delta C}$, then the above set of equations can be written in matrix form as $$\vec{\Delta L} = [V] \vec{\Delta C} \quad (26)$$

where $[V]$ = the matrix of partial derivatives

Equations (26) is solved for $\vec{\Delta C}$, so that a quantity of pigment can be added to the current batch to occupy the same position in color space as the standard.

However, in order to have a unique solution, we must have the same number of concentration variables as we have elements in $\vec{\Delta L}$. The number of elements in $\vec{\Delta L}$ is 3X the number of viewing angles that we elect to fit.

Examination of the model, equations (8), (9) and (10) will show that we have one less concentration variable than we have pigments.

Thus, in order to match a metallic color, the number of pigments in the mixture must equal 3X the number of angles at which a match is desired plus 1.

For example, in order to match a color at two angles, we must have a seven pigment mixture.

In practice, the number of pigments in a metallic color seldom exceeds six. Thus, we must give up the motion of color matching in this case, and introduce the concept of minimum difference or least square color matches. Since the cube root coordinate system is nearly uniform visually, a least square solution to (26) will move the current batch to the point of closest approach to the standard, which should correspond to the least observable difference. Thus $\sqrt{\Delta E} = \Delta L^2 + \Delta a^2 + \Delta b^2$ is minimized.

Another factor to consider in shading is that pigments may only be added. That is, any solution vector, $\vec{\Delta C}$, containing negative elements, is infeasible. However, it can be shown that there always exists a solution vector having all positive elements. This is intuitively obvious, since it should be possible to move anywhere in concentration space by adding sufficient quantities of pigment.

COMPUTER PROGRAMS — OPERATION AND RESULTS

This section describes the operation of the computer programs which carry out certain of the steps on the flow sheet. Programs and examples of progam output are given in the Appendix.

All of the computation steps of this invention can be performed with six programs. The initial calibration procedure of FIG. 1A is performed by programs CALIBRATE, KSMET 1 and KSMET 2. These programs are respectively given in appendices A, B and C. The programs perform the calibration procedures of FIG. 1A. The basic language program listings in the appendix are exemplary only; many different listings will perform the necessary steps of the invention.

The formulation procedures of FIG. 1B are performed by program MFORM. The program is listed in appendix D and a short description of its operation is subsequently given.

The computation steps in the shading procedure of FIG. 1C are performed by programs MSHADE and METVEC. These programs are listed in appendices E and F and a short description of their operation is given hereafter.

Generation of Shading Vectors

Step 69 — Program METVEC

As pointed out above, shading vectors are the first partial derivatives of the color coordinates with respect to the weight fraction concentration of each pigment making up the mixture.

Program METVEC calculates shading vectors under light source C using the technique of numerical approximation. Vectors are generated based on the full formula of the standard color. Thus, the current batch is shaded using vectors that apply only at the color coordinates of the full formula. In practice, batches are loaded sufficiently close to the full formula that no probelm is encountered in shading.

Input data is entered into the MVDATA file as shown in Appendix 1. Three sets of data are shown.

Each set consists of the following:
1. The formula code
2. The tint paste line number
3. The number of diffusing pigments
4. The number of metallic pigments
5. The number of angles to be shaded
6. The shading angles in degrees
7. The color coordinates of the standard color, G, R, B for each shading angle
8. For each pigment a. the pigment code
    b. the character "P" or "T" indicating whether the load concentration data is in terms of tint paste, or pure pigment
    c. the concentration in the load
    d. the concentration in the shading step The program assumes that the portion specified in the shading step is always tint paste. In addition, the basis of the formula from which the data is taken is assumed to be 100 pounds. That is, the total weight including resin and solvent is assumed to be 100 pounds. Thus, the vectors obtained apply to a production batch of 100 weight units.

Execution of program METVEC is given in Appendix 2. The program prints the formula code and tint paste line as a job heading, followed by the experimental and theoretical color coordinates of the standard in G, R, B and L, a, b coordinates at each angle. This information is of value in determining if the formula specified is reasonably close in color coordinates to the measured value of the standard. It is a check both on the input data and on the ability of the metallic color matching model to accurately predict color coordinates.

Comparison of the experimental and predicted color coordinates in Appendix 2, indicates some divergence between theory and experiment. However, in order to shade colors, it is not necessary to predict color coordinates with great accuracy. It is only necessary to predict changes in color coordinates with respect to pigment additions that will allow shading to color coordinate differences that are within experimental error. Thus a more accurate model would be of no additional value if the color match is limited by experimental error.

After the color coordinates of the standard are printed, the user is asked to name the file to which the vectors are to be written, and whether the file is to be scratched before writing.

In response to a "NO" to the scratch question, the program appends the vectors to the named file (MVEC).

The vectors calculated are shown in Appendix 3.
The information written to the vector file is:
1. The product code
2. The number of pigments (diffuse and metallic)
3. The number of shading angles
4. The product weight basis (100)
5. The shading angles in degrees
6. The tint paste codes corresponding to the pigment and tint paste line.
7. The vectors, in columnwise order of pigment, and in row-wise order of L, a, b for each shading angle in the order in which they were entered.

Program METVEC will generate vectors, for up to four shading angles, for mixtures containing up to 10 pigments, of which up to seven may be diffuse and up to three may be metallic.

Calculation of Pigment Additions for Shading

Step 70 — Program MSHADE

Program MSHADE is designed to calculate positive pigment additions at up to four shading angles, and for mixtures containing up to 10 pigments.

The input data required is shown in Appendix 3 under the heading MLAB.

The data consists of

1. The product code
2. The weight of the current batch
3. The number of shading angles
4. The shading angles in degrees
5. The color coordinates of the standard in the order G, R, B for each shading angle
6. The color coordinates of the current batch in the same order as (No. 5) above Execution of the program is shown in Appendix 4.

The user is asked to give the file names for shading and vector data, and the sequential position of the data set in the shading file for which a "hit" is desired.

The allowable maximum difference in L, a, b space between standard and batch at each shading angle is entered in response to the tolerance question.

The difference in color coordinates between the standard and the current batch is printed by the program at each shading angle. The results shown under DE is the distance in L, a, b color space between standard and batch.

The program locates the appropriate vectors in the MVEC file, prints the tint paste codes as headings and then proceeds to compute all one, two, three----n, components hits, where n is the smaller of the number of pigments minus one, or three times the number of shading angles.

Tint paste additions that contain all positive elements and satisfy the tolerance requirements at each shading angle are printed under the appropriate tint paste heading. The predicted difference color space between standard and batch is printed under DE for each viewing angle, in the order in which the angles were entered.

The examples provided in Appendix 4 resulted from panels made up according to the data entered in the MVDATA file, Appendix 1.

The experimental difference, in tint paste concentration between standard and batch is compared in the following table with the best hit selected, as indicated by the arrows in Appendix 4.

In practice this would only be done in desperation, to save a batch. The best hit obviously contains the proper pigments, but the amounts are not quite correct.

In the third example, there are two best-hit candidates. Hit No. 1 is the correct hit, and agrees with the known differences, while Hit No. 2 is a valid hit, but will result in a metameric match to the standard. The danger of metameric matches is always present when more than four pigments are used.

To avoid metameric matches, we could shade under two light sources. This would require only minor modifications to the programs; but would double the amount of data required and the computation cost.

However, metamerism should not be a major problem in production shading, since the quantity of each tint paste withheld for shading is known. Consequently, metameric hits should be easily spotted.

In shading laboratory formulations, it may sometimes be necessary to split the batch in order to determine the least metameric fit. This was actually done with the third example. It was found that both hits gave good color matches, but that the batch produced using hit No. 2 was metameric to the standard.

Formulation of Metallic Colors

Steps 55 and 56 — Program MFORM

In color formulation, the problem is to determine a pigment formulation that will match a given standard under any light source. As a minimum requirement, the color must match the standard under light source C (average daylight).

As pointed out in the previous section, it is impossible to obtain a match at two viewing angles even under a single light source, unless at least seven pigments are present in the mixture. Since, in practice, metallic colors seldom contain more than six pigments, it is important to select the same pigments as were used to make the standard. This selection is generally done by trial and error. The primary value of the computer program

| Product Code 4320-68 | | | | | | |
|---|---|---|---|---|---|---|
| Tint Code | TDR-10 | TDR-12 | TBN-35 | TBM-10 | | |
| Exp. Diff. | .49 | .38 | .4 | 0 | | |
| Hit | .483 | .362 | .457 | 0 | | |
| Product Code 4320-69 | | | | | | |
| Tint Code | TBY-87 | TBY-89 | TBY-90 | TBW-44 | TBM-10 | |
| Exp. Diff. | 0 | .35 | 1 | .24 | 0 | |
| Hit | 0 | .311 | 1.927 | .972 | 0 | |
| Product Code 4320-71 | | | | | | |
| Tint Code | TBG-22 | TBL-41 | TBY-87 | TBN-35 | TBW-44 | TBM-10 |
| Exp. Diff. | .6 | 0 | 1 | .5 | .3 | 0 |
| Hit No. 1 | 1.58 | 0 | .782 | .562 | .402 | 0 |
| Hit No. 2 | 0 | .687 | 2.675 | .269 | .353 | 0 |

These examples do not represent the simplest shading situations. In the first two cases more than one pigment of a given color type is used.

For example, in the first case, two red pigments were used with a black and a metallic pigment. The calculated hit agress almost perfectly with the known difference in tint paste.

In the second example, the mixture consists of three yellow pigments, a white pigment and the metallic. In this case there is some confusion between the amounts of the various yellows and white. However, the hit selected is "best" since the selection of the last hit (which is predicted to give a better match) would result in a doubling of the batch.

is to determine an appropriate starting formulation for shading into the standard, as well as to give a rough indication of the quality of the match that will be obtained.

The data required by the program is exemplified by Appendix 5 and is as follows:
1. Code name of the standard
2. Tint paste line
3. Gloss (Not used in the program)
4. Number of decimal places in the spectrophotometer readout
5. Colorimeter reading at 75°, 80° and 85° for G, R, and B
6. The spectrophotometer reflectance values Execution of the program is shown in Appendix 6. The user is asked to designate the input data file and the operation to be performed. The operations programmed are as follows:

| Option No. | Program Operation |
| --- | --- |
| 1. | Program requests data set number and fetches the specified set from the input data file. |
| 2. | Program fetches next data set from the input data file. |
| 3. | Program requests the number of diffuse and metallic pigments and the pigment codes. Program computes a least square spectral match to the diffuse and angular reflectance. |
| 4. | Program computes a least square spectral match using the pigments currently in computer code memory. |
| 5. | Program computes a least square color match using the spectral match as a starting point |
| 6. | Program plots predicted and experimental reflectance. |
| 7. | Program terminates. |

In response to option 3, the user must give the number of diffusing pigments first, followed by the number of metallic pigments. Up to three metallic pigments, and up to seven diffusing pigments may be specified. The total number of pigments may not exceed 10.

The order of the pigment codes is immaterial, except that the metallic pigments must be specified last.

The program decomposes the input reflectance spectra into diffuse and metallic components. Both components of reflectance are fitted simultaneously in a least square sense.

A first guess for pigment concentrations is built into the program. This is done by linearizing the metallic reflectance portion of the model and solving for pigment concentrations via least squares.

At least square color match is obtained in L, a, b coordinates for the diffuse and metallic portions of the color under light sources C and A simultaneously. Light source C is weighted 20 times more heavily than light source A. Thus, pigment compositions will be selected to come as close as possible to a match under light source C while considering the closeness of the match in source A space.

The program output gives the code name of the standard plus the heading information as read from the input data file, followed by the pigment codes, the weight fraction of each pigment, the tint paste codes (corresponding to the line specified in the input data file), and the weight fraction of each tint paste. Thus either a pigment or a tint paste formula may be made up.

The program prints the sum of the squared deviation between predicted and estimated diffuse and metallic reflectance after each weight fraction formula.

When a color match is requested, the program prints the difference between the standard and predicted colors, under light source C, for the L, a, and b coordinates, for the diffuse and angular coordinates separately, as well as the distance between the standard and predicted color. These values are printed under the headings DL, DA, DB and DE. In addition, the total difference between the standard and predicted colors, under light source C, is printed following DE=.

As a measure of metamerism, the distance between the standard and predicted colors under light source A for the diffuse, the angular and the total color is printed following MI=. The total color difference is the square root of the sum of the squares of the diffuse and angular differences.

Five examples of least square spectral matches are given in Appendix 6. The standards were made up in the laboratory using the specified pigments. The computed pigment compositions may be compared with the actual compositions as shown in Appendix 7. The agreement between theory and experiment is generally very good for the colored pigments, while the program sometimes has difficulty in estimating the split between metallic and white pigments. This difficulty is not surprising since the split between white and metallic pigments is largely determined by the split between diffuse and metallic reflectance. Since the decomposition of total reflectance into diffuse and metallic components is done using colorimeter readings at high viewing angles, and since these readings are subject to rather large experimental error, especially as the readings become small, it is expected that the program will have most difficulty estimating the white-metallic pigment composition.

For example, the least accurate prediction between white and metallic corresponds to panel 45. Comparing the size of the colorimeter readings for this panel as given in the input data (Appendix 5) with the colorimeter readings for the other panels indicates that these are by far the smallest. However, the weight fraction formulas predicted by the model are sufficiently good that no difficulty should be experienced in shading the formulas into acceptable color matches.

Execution of Program MFORM for least square color matches is given in Appendix 8. Comparison of values predicted pigment compositions with the alues given in Appendix 7 indicate that the color matching feature of the program does not generally give better approximations to the experimental compositions than the spectral matching procedure.

However, when the pigmentation is unknown, or if the correct pigments are unavailable, the least square color match composition should provide a better starting point for shading. The overall distance between standard and predicted colors under light source C and A is given in Appendix 9.

These results indicate that when the pigmentation selected is correct, the experimental and theoretical error is on the order of two to four units in L, a, b space.

Thus, the formulation program cannot be used to distinguish between alternate pigmentations, when the predicted color differences are of this magnitude. However, when predicted differences are larger than those given, it is reasonable to assume that the pigment selection is incorrect.

The program may also be used to assist in the selection of pigments.

As an example, all seven pigments used in the study were included in the calculation for least square spectral match as shown in Appendix 10. The computed formulations are in substantial agreement with the experimental formulas as shown in Appendix 11.

NOMENCLATURE

| | |
|---|---|
| a | = coordinate in cube root color coordinate system |
| $AGF(\theta)$ | = angular metallic factor for G values |
| B | = color coordinate in G, R, B color coordinate system |
| b | = color coordinate in cube root color coordinate system |
| C | = weight fraction pigment composition |
| G | = coordinate in G, R, B color coordinate system |
| $GF(\theta)$ | = geometric factor for diffuse reflectance |
| Hx, Hy, Hz | = tristimulus values of the standard observer for light source C |
| i | = intensity of light flux traveling toward the substrate |
| j | = intensity of light flux traveling toward the surface of the film |
| k | = pigment absorption constant, $ft^2$/No. |
| L | = sum of absorption and scatter constant, $ft^2$/No. |
| | = a coordinate in cube root coordinate system |
| M | = the number of metallic pigments in the pigment blend |
| $MG(\theta)$ | = the metallic G value as a function of setting angle, $\theta$ |
| N | = the number of light diffusing pigments in the pigment blend |
| R' | = the reflectance as predicted by the KUBELKA-MUNK theory |
| R | = the reflectance as measured in air, or as predicted by the KUBELKA-MUNK theory after correction for flux loss due to internal reflection. |
| | = a coordinate in the G, R, B color coordinate system |
| S | = scatter constant for light diffusing pigments |
| | = reflectance constant for metallic pigments |
| $SG(\theta)$ | = surface gloss as a function of colorimeter setting angle |
| x | = distance from surface of film toward substrate measured along a normal to the surface |

Subscripts

| | |
|---|---|
| a | = pertaining to the direction of the incident flux |
| d | = pertaining to the diffuse flux |
| o | = pertains to a value at the surface of the film |
| 1, 5 | = pertains to the light diffusing type pigments |
| 2,3,4,6 | = pertains to the metallic type pigments |

Greek Symbols

| | |
|---|---|
| $\alpha,\beta,\gamma$ | = constants in equation for conversion of R' to R |
| $\Delta$ | = a difference between standard and current batch |
| $\lambda$ | = a distinct value of wave length |
| $\theta$ | = angular setting on the modified colorimeter |

CALIBRAT                                              APPENDIX A

```
100 FILES MDATA;GEOGLOSS
105 PRINT "INPUT, OUTPUT FILE NAMES";
106 INPUT A1$,A2$
107 FILE #1,A1$
108 FILE #2,A2$
110 DIM A(3,18),B(3,18),C(3,18),D(3,18),E(1,18),F(1,18)
112 DIM G(3,18),H(1,18)
115 REM CALCULATE GEOMETRIC FACTOR FOR DIFFUSE RADIATION
117 N=0
120 MAT READ #1,A
130 FOR I=1 TO 18
140 FOR J=1 TO 3
150 C(J,I)=A(J,I)/A(J,1)
160 E(1,I)=E(1,I)+C(J,I)
170 NEXT J
180 E(1,I)=E(1,I)/3
190 NEXT I
200 PRINT "GEOMETRIC FACTOR FOR G,R,B VS ANGLE"
210 PRINT
220 PRINT "ANGLE";TAB(13);"G";TAB(23);"R";TAB(33);"B";TAB(43);"AVG."
240 S=0
250 FOR I=1 TO 18
260 PRINT S;TAB(10);INT(C(1,I)*10↑4+.5)/10↑4;
261 PRINT TAB(20);INT(C(2,I)*10↑4+.5)/10↑4;
262 PRINT TAB(30);INT(C(3,I)*10↑4+.5)/10↑4;
264 PRINT TAB(40);INT(E(1,I)*10↑4+.5)/10↑4
270 S=S+5
280 NEXT I
290 SCRATCH #2
300 MAT WRITE #2,E;
315 REM CALCULATE GLOSS VS ANGLE
320 MAT READ #1,B
322 IF END #1 THEN 900
324 MAT F=ZER(1,18)
```

APPENDIX A (cont'd)

```
326 N=N+1
330 FOR I=1 TO 18
340 FOR J=1 TO 3
350 D(J,I)=B(J,I)-C(J,I)*B(J,I)
360 F(1,I)=F(1,I)+D(J,I)
370 NEXT J
380 F(1,I)=F(1,I)/3
390 NEXT I
392 GO SUB 400
394 MAT H=H+F
396 MAT G=G+D
398 GO TO 320
400 PRINT
410 PRINT "GLOSS VALUES FOR G,R,B VS ANGLE"
420 PRINT
430 PRINT "ANGLE";TAB(13);"G";TAB(23);"R";TAB(33);"B";TAB(43);"AVG."
440 PRINT
450 S=0
460 FOR I=1 TO 18
470 PRINT S;TAB(10);INT(D(1,I)*10↑4+.5)/10↑4;
472 PRINT TAB(20);INT(D(2,I)*10↑4+.5)/10↑4;
474 PRINT TAB(30);INT(D(3,I)*10↑4+.5)/10↑4;
475 PRINT TAB(40);INT(F(1,I)*10↑4+.5)/10↑4
477 S=S+5
480 NEXT I
490 RETURN
900 PRINT
910 PRINT "AVERAGE GLOSS VALUES"
915 PRINT
920 MAT F=(1/N)*H
930 MAT D=(1/N)*G
940 GO SUB 400
942 F(1,2)=0
944 FOR I=10 TO 18
945 F(1,I)=0
946 NEXT I
950 MAT WRITE #2,F;
1000 END

KSMET1                  APPENDIX B

100 FILES MDATA;GEOGLOSS;TSV;MDATA1;W272
110 DELIMIT #1,( )
112 MARGIN #4,72
114 MARGIN #5,72
120 DIM A(3,18),B(45,18),C(45,8),D(3,45),E(3,45),F(31,45)
130 DIM G(45,18),H(3,18),I(3,18),M(3,31),R(45,18),Z(1,31)
135 DIM S(3,45)
136 DIM P$(7)
140 MAT READ #3,M,M
150 MAT READ #2,A(1,18),H(1,18)
160 PRINT "NO OF PIG, NO OF PANELS";
170 INPUT N1,N2
172 PRINT "PIG CODES";
174 MAT INPUT P$(N1)
175 PRINT "NO OF PANELS TO LEAVE OUT OF ANG. FAC.";
176 INPUT Q2
177 PRINT "PANEL # TO LEAVE OUT"
178 MAT INPUT Q(1,Q2)
180 REM GET INPUT DATA
190 GO SUB 1000
200 MAT D=ZER(3,N2)
210 REM CALCULATE X,Y,Z FOR TOTAL REFLECTANCE
220 MAT D=M*F
230 REM CONVERT XYZ INTO G,R,B
240 GO SUB 2000
250 REM CORRECT G,R,B FOR GLOSS, CALCULATE DIFFUSE AND ANGULAR PORTIONS
270 GO SUB 3000
280 REM CALC ANGULAR FACTORS
```

```
290 GO SUB 4000
300 PRINT "WRITE ANGULAR FACTORS TO FILE  ";P$(N1)
302 INPUT Z$
304 IF Z$="NO" THEN 340
310 FILE #5,P$(N1)
320 SCRATCH #5
330 MAT WRITE #5,I:
340 SCRATCH #4
350 WRITE #4,N1,N2
360 FOR I=1 TO N1
365 WRITE #4,P$(I):
370 NEXT I
375 WRITE #4
380 MAT WRITE #4,C:F:
390 REM CALCULATE DIFFUSE REFLECTANCE
400 GO SUB 5000
410 MAT WRITE #4,F:
450 GO TO 9000
1000 REM READ INPUT DATA
1010 MAT C=ZER(N2,N1)
1015 MAT F=ZER(31,N2)
1020 MAT READ #1,C
1030 FOR I=1 TO N2
1040 READ #1,A1
1050 MAT READ #1,Z
1060 MAT Z=(10↑-A1)*Z
1070 FOR J=1 TO 31
1080 F(J,I)=Z(1,J)
1090 NEXT J
1100 NEXT I
1120 MAT G=ZER(N2,18)
1130 MAT R=ZER(N2,18)
1140 MAT B=ZER(N2,18)
1150 MAT READ #1,G,R,B
1200 RETURN
2000 REM SUBROUTINE TO CONVERT XYZ INTO GRB
2010 MAT E=ZER(3,N2)
2020 FOR I=1 TO N2
2030 E(1,I)=D(2,I)
2040 E(2,I)=1.0216*D(1,I)-.00122*D(3,I)
2050 E(3,I)=.8457*D(3,I)
2060 E(2,I)=(E(2,I)-.2*E(3,I))/.8
2070 NEXT I
2100 RETURN
3000 REM CORRECT GRB READINGS FOR GLOSS,AND CALCULATE DIF-ANG PORTIONS
3010 FOR I=1 TO N2
3030 FOR J=1 TO 18
3050 G(I,J)=G(I,J)-H(1,J)
3060 R(I,J)=R(I,J)-H(1,J)
3070 B(I,J)=B(I,J)-H(1,J)
3080 NEXT J
3090 NEXT I
3095 MAT S=ZER(3,N2)
3100 FOR I=1 TO N2
3120 FOR J=16 TO 18
3130 S(1,I)=S(1,I)+(G(I,J)/(3*A(1,J)))
3140 S(2,I)=S(2,I)+(R(I,J)/(3*A(1,J)))
3150 S(3,I)=S(3,I)+(B(I,J)/(3*A(1,J)))
3160 NEXT J
3170 NEXT I
3180 FOR I=1 TO N2
3190 FOR J=1 TO 18
3200 G(I,J)=G(I,J)-S(1,I)*A(1,J)
3210 R(I,J)=R(I,J)-S(2,I)*A(1,J)
3220 B(I,J)=B(I,J)-S(3,I)*A(1,J)
3230 NEXT J
3240 NEXT I
3250 RETURN
4000 REM CALC ANGULAR FACTORS
4010 FOR I=1 TO N2
4020 S1=E(1,I)-S(1,I)
4030 S2=E(2,I)-S(2,I)
```

KSMET1 APPENDIX B—CONTINUED

```
4040 S3=E(3,I)-S(3,I)
4050 FOR J=1 TO 13
4060 G(I,J)=G(I,J)/S1
4070 R(I,J)=R(I,J)/S2
4080 B(I,J)=B(I,J)/S3
4090 NEXT J
4100 NEXT I
4200 FOR I=1 TO 13
4220 FOR J=1 TO N2
4225 FOR K=1 TO Q2
4226 IF J=Q(I,K) THEN 4260
4227 NEXT K
4230 I(1,I)=I(1,I)+G(J,I)
4240 I(2,I)=I(2,I)+R(J,I)
4250 I(3,I)=I(3,I)+B(J,I)
4260 NEXT J
4270 NEXT I
4280 MAT I=(1/(N2-Q2))*I
4285 PRINT "ANGULAR FACTORS"
4288 PRINT
4289 S=0
4290 PRINT "PAN #       G        R       B"
4291 FOR I=1 TO 18
4292 PRINT "DEGREES ";S
4293 FOR J=1 TO N2
4294 FOR K=1 TO Q2
4295 IF J=Q(I,K) THEN 4298
4296 NEXT K
4297 PRINT J;G(J,I);R(J,I);B(J,I)
4298 NEXT J
4299 PRINT "AVERAGE"
4300 PRINT INT(I(1,I)*10↑3+.5)/10↑3;INT (I(2,I)*10↑3+.5)/10↑3;
4310 PRINT INT(I(3,I)*10↑3+.5)/10↑3
4315 S=S+5
4320 NEXT I
4400 RETURN
5000 REM CALCULATE DIFFUSE REFLECTANCE
5010 FOR J=1 TO 10
5020 M(1,J)=0
5030 NEXT J
5040 FOR J=1 TO 31
5050 LET Z(1,J)=1.275*M(1,J)+M(2,J)+.8467*M(3,J)
5060 FOR I=1 TO N2
5070 S1=S(1,I)*M(2,J)/E(1,I)
5080 S2=S(2,I)*1.275*M(1,J)/E(2,I)
5090 S3=S(3,I)*.8467*M(3,J)/E(3,I)
5100 S=(S1+S2+S3)/Z(1,J)
5110 F(J,I)=F(J,I)*S
5120 NEXT I
5130 NEXT J
5200 RETURN
9000 END
```

KSMET2 APPENDIX C

```
100 FILES MDATA1:W272:NRAND
110 DIM A(31,45),B(31,45),C(45,7),D(2,31),E(90,1)
120 DIM F(90,7),G(7,90),H(7,7),I(7,7),J(7,1),K(7,31)
130 DIM L(2,11),P(7,1),Q(45,2),S(7,31),T(45,2),Y(1,7),Z(7,31)
132 DIM U(107),U$(100)
140 DIM P$(7)
142 SET W3 TO 1
143 READ :3,V3,V4
144 SET W3 TO 601
145 FOR I=1 TO V3
146 READ :3,U$(I),U(I)
```

KSMET2                APPENDIX C—CONTINUED

```
147 NEXT I
155 PRINT "NUMBER OF CONSTANTS IN MODEL";
157 INPUT N6
160 REM READ INPUT DATA
170 GO SUB 1000
200 REM READ PIGMENT CONSTANTS
210 GO SUB 2000
215 O1=0
220 C3=.578
240 C4=.005
250 C5=.4
255 V2=1
260 MAT K=(10↑-5)*K
270 MAT S=(10↑-5)*S
271 MAT E=ZER(2*N2,1)
272 MAT G=ZER(N6,2*N2)
273 MAT F=ZER(2*N2,N6)
274 MAT H=ZER(N6,N6)
275 MAT I=ZER(N6,N6)
276 MAT J=ZER(N6,1)
277 MAT P=ZER(N6,1)
278 MAT Z=ZER(N6,31)
280 PRINT "INITIAL GUESS";
290 MAT INPUT Y(1,N6)
295 V1=V2
300 MAT P=TRN(Y)
305 PRINT "WAVE    SUM OF SQUARES       K2        S2        S3       OPTION"
306 PRINT "LENGTH  SEPARATE SUMMED"
310 FOR V2=V1 TO 31
320 MAT L=ZER(2,11)
330 GO SUB 3000
335 S=L(1,1)
337 MAT L=ZER(2,11)
340 FOR I=1 TO 10
350 GO SUB 4000
390 GO SUB 5000
410 MAT P=P+J
420 GO SUB 3000
430 IF ABS(S-L(1,1))<1E-6 THEN 445
435 S=L(1,1)
440 NEXT I
445 L(1,1)=L(1,1)/(2*N2)
446 L(2,1)=L(2,1)/N2
450 PRINT 380+10*V2;TAB(8);INT(L(1,1)*10↑6+.5)/10↑6;TAB(17);
452 PRINT INT(L(2,1)*10↑5+.5)/10↑6;TAB(27);INT(P(1,1)*10↑5+.5)/10↑1;
454 PRINT TAB(35);INT(P(2,1)*10↑5+.5)/10↑1;
455 PRINT TAB(45);INT(P(3,1)*10↑6+.5)/10↑1;
460 O=1
465 PRINT.
470 ON O GO TO 540,280,510
480 PRINT "CONSTANTS"
490 MAT Y=TRN(P)
500 MAT PRINT Y;
505 GO TO 530
510 PRINT "REFLECTANCE"
512 PRINT "DIF    DIF    TOTAL    TOTAL"
513 PRINT "EXP    THEO   EXP      THEO"
515 FOR I=1 TO N2
520 PRINT INT(B(V2,I)*10↑4+.5)/10↑4;INT(Q(I,1)*10↑4+.5)/10↑4;
525 PRINT INT((A(V2,I)+B(V2,I))*10↑4+.5)/10↑4;
527 PRINT INT((Q(I,1)+Q(I,2))*10↑4+.5)/10↑4
528 NEXT I
530 GO TO 460
540 FOR I=1 TO N6
560 Z(I,V2)=P(I,1)
570 NEXT I
580 NEXT V2
586 O2=10↑5
587 FILE #2,PS(N5)
588 APPEND #2
```

KSMET2  APPENDIX C—CONTINUED

```
589 MAT Z=(Q2)*Z
590 MAT WRITE #2,Z;
700 GO TO 9000
1000 REM READ INPUT DATA
1010 READ #1,N5,N2
1015 MAT READ #1,P$(N5)
1020 MAT READ #1,C(N2,N5)
1030 MAT READ #1,A(31,N2)
1040 MAT READ #1,B(31,N2)
1050 MAT A=A-B
1060 RETURN
2000 REM READ PIGMENT CONSTANTS
2003 FOR I=1 TO 7
2004 U(100+I)=0
2005 NEXT I
2008 V5=0
2009 FOR L=1 TO V3
2010 FOR I=1 TO N5-1
2012 IF P$(I)=U$(L) THEN 2020
2015 NEXT I
2017 GO TO 2025
2020 U(100+I)=U(L)
2022 V5=V5+1
2024 IF V5=N5-1 THEN 2027
2025 NEXT L
2027 FOR I=1 TO N5-1
2028 IF U(100+I)>0 THEN 2034
2030 PRINT P$(I)," NOT IN THE FILE"
2032 GO TO 9000
2034 NEXT I
2036 FOR I=1 TO N5-1
2037 SET W3 TO U(100+I)
2038 READ:3,P$(I)
2039 MAT READ:3,D
2040 FOR J=1 TO 31
2050 K(I,J)=D(1,J)
2060 S(I,J)=D(2,J)
2070 NEXT J
2080 NEXT I
2100 RETURN
3000 REM CALCULATE REFLECTANCE (MODEL)
3010 FOR J=1 TO 42
3020 LET C9=C(J,N5)
3030 LET S1=K1=0
3040 FOR M=1 TO N5-1
3050 K1=K1+C(J,M)*K(M,V2)
3060 S1=S1+C(J,M)*S(M,V2)
3070 NEXT M
3080 K2=P(1,1)*C9
3090 S2=P(2,1)*C9
3100 S3=P(3,1)*C9
3110 S4=3.35*ABS(S1)
3120 L=K1+K2+S1+S2+S3
3130 A=(L↑2-(S1+S2+S3)↑2)↑.5
3140 L1=A+L+S4
3150 L2=L+S4
3160 R1=((S1+S3)/L1)+(S1+S2+S3)*S4/(L1*(A+L))
3170 Q(J,1)=(.578*R1-.005)/(1-.4*R1)
3180 Q(J,2)=S2/L2
3260 IF Q1=1 THEN 3290
3270 E(J,1)=(A(V2,J)-Q(J,2))
3275 E(N2+J,1)=B(V2,J)-Q(J,1)
3280 L(1,1)=L(1,1)+E(J,1)↑2+E(N2+J,1)↑2
3285 L(2,1)=L(2,1)+(A(V2,J)+B(V2,J)-Q(J,1)-Q(J,2))↑2
3290 NEXT J
3300 RETURN
4000 REM CALC MATRICES FOR LEAST SQUARES
4005 N8=1.01
4010 MAT F=ZER(2*N2,N6)
```

KSMET2 APPENDIX C—CONTINUED

```
4020 Q1=1
4030 MAT T=Q
4040 FOR N=1 TO N6
4050 P(N,1)=P(N,1)*N8
4055 N9=P(N,1)*(N8-1)
4060 GO SUB 3000
4070 FOR M=1 TO N2
4080 F(M,N)=(Q(M,2)-T(M,2))/(N9)
4090 F(N2+M,N)=(Q(M,1)-T(M,1))/(N9)
4100 NEXT M
4110 P(N,1)=P(N,1)/N8
4120 NEXT N
4130 Q1=0
4140 RETURN
5000 REM CALC LEAST SQUARE SOLUTION
5010 MAT G=TRN(F)
5020 MAT H=G*F
5030 MAT I=INV(H)
5040 MAT F=ZER(N6,2*N2)
5050 MAT F=I*G
5060 MAT J=F*E
5070 RETURN
9000 END
```

MFORM                               APPENDIX D

```
100 FILES MRDATA;W272;GEOGLOSS;NRAND
102 PRINT "DATA FILE";
104 INPUT C$
106 IF C$="MRDATA" THEN 110
108 FILE #1,C$
110 DELIMIT #1,( )
120 DIM A(31,2),B(3,31),C(135),D(6,20),E(10,10),F(9,31)
130 DIM G(3,3),H(10,1),I(10),J(31,2),K(7,31),L(6,2)
140 DIM M(6,31),N(6,2),O(31,18),P(10,1),Q(31,2),R(1,31),S(7,31)
150 DIM T(1,10),U(10,62),V(62,10),W(10,10),X(6,1)
160 DIM Y(62,1),Z(1,18)
170 DIM P$(10),T$(10),A$(15),U$(100)
175 DIM I$(10)
200 C3=.578
205 C4=.005
210 C5=.4
220 MAT READ #3,Z
221 SET W4 TO 1
222 READ:4,V1,V2
223 SET W4 TO 11
224 MAT READ:4,M
230 SET W4 TO 104
231 MAT READ:4,B
232 SET W4 TO 601
233 FOR I=1 TO V1
234 READ:4,U$(I),C(I)
235 NEXT I
236 FOR I=1 TO 10
237 B(1,I)=0
238 NEXT I
240 PRINT "OPTION";
250 INPUT O
260 ON O GO TO 1000,1040,270,320,550,9000,99000
270 PRINT "NO OF PIG";
280 INPUT N5,N6
290 N7=N5+N6
292 MAT P=ZER(N7,1)
295 PRINT "PIG CODES";
300 MAT INPUT P$(N7)
310 GO SUB 2000
```

MFORM  APPENDIX D—CONTINUED

```
315 N7=N7-1
320 GØ SUB 4000
335 I1=62
337 GØ SUB 7000
340 GØ SUB 3000
385 S9=X2=1
387 GØ SUB 3000
390 FØR V=1 TØ 10
395 R9=1
420 GØ SUB 5000
427 S9=X1=0
428 FØR I=1 TØ N7
430 P(I,1)=P(I,1)+(R9)*H(I,1)
431 IF P(I,1)>0 THEN 433
432 P(I,1)=0
433 S9=S9+P(I,1)
434 NEXT I
435 S9=S9+P(N7+1,1)
436 MAT P=(1/S9)*P
438 GØ SUB 3000
450 IF ABS(X1-X2)<1E-4 THEN 470
455 X2=X1
460 NEXT V
470 C$="SPECTRAL MATCH"
480 GØSUB 10000
530 GØ TØ 240
540 REM CALC CØLØR MATCH
550 I1=12
552 W1=.05
554 W2=.05
555 W3=1
557 W4=1
560 GØ SUB 7000
570 MAT Ø=ZER(31,2*N7)
575 MAT D=ZER(6,2*N7)
580 MAT N=M*A
582 MAT L=N
585 GØ SUB 8000
587 MAT N=L
590 FØR Y7=1 TØ 4
600 GØ SUB 3000
605 MAT L=M*J
610 MAT D=M*Ø
615 GØ SUB 8500
616 GØ SUB 8000
618 M1=M2=E1=E2=0
620 FØR I=1 TØ 3
630 Y1=N(I,1)-L(I,1)
635 Y2=N(I,2)-L(I,2)
640 Y3=N(I+3,1)-L(I+3,1)
645 Y4=N(I+3,2)-L(I+3,2)
650 M1=M1+Y1↑2
655 M2=M2+Y2↑2
657 E1=E1+Y3↑2
658 E2=E2+Y4↑2
660 Y(I,1)=Y1*W1
662 Y(I+3,1)=Y2*W2
664 Y(I+6,1)=Y3*W3
666 Y(I+9,1)=Y4*W4
670 NEXT I
680 IF E1+E2<2E-3 THEN 860
690 FØR I=1 TØ 3
700 FØR J=1 TØ N7
710 V(I,J)=D(I,J)*W1
720 V(I+3,J)=D(I,J+N7)*W2
730 V(I+6,J)=D(I+3,J)*W3
740 V(I+9,J)=D(I+3,J+N7)*W4
750 NEXT J
760 NEXT I
```

MFORM           APPENDIX D—CONTINUED

```
770 GO SUB 5100
780 S9=0
790 FOR I=1 TO N7
800 P(I,1)=P(I,1)+H(I,1)
810 S9=S9+P(I,1)
820 NEXT I
830 S9=S9+P(N7+1,1)
840 MAT P=(1/S9)*P
850 NEXT Y7
860 C$="COLOR MATCH"
870 GO SUB 10000
880 PRINT "        DL        DA        DB        DE"
890 PRINT "DIF ";INT(Y(7,1)*10↑3+.5)/10↑3;INT(Y(8,1)*10↑3+.5)/10↑3;
892 PRINT INT(Y(9,1)*10↑3+.5)/10↑3;INT((SQR(E1))*10↑3+.5)/10↑3
900 PRINT "MET ";INT(Y(10,1)*10↑3+.5)/10↑3;INT(Y(11,1)*10↑3+.5)/10↑3;
905 PRINT INT(Y(12,1)*10↑3+.5)/10↑3;INT((SQR(E2))*10↑3+.5)/10↑3
907 PRINT "DE=";INT((SQR(E1+E2))*10↑3+.5)/10↑3
910 PRINT "MI=";INT ((SQR(M1))*10↑3+.5)/10↑3;
911 PRINT INT((SQR(M2))*10↑3+.5)/10↑3;
912 PRINT INT((SQR(M1+M2))*10↑3+.5)/10↑3
920 GO TO 240
1000 REM READ MRDATA FILE
1010 PRINT "SET";
1020 INPUT Q9
1025 RESTORE #1
1030 FOR I=1 TO Q9
1040 READ #1,F5$,Z7,G1,A1
1050 MAT READ #1,G
1060 MAT READ #1,R(31,1)
1070 IF 0=2 THEN 1090
1080 NEXT I
1090 MAT R=(10↑-A1)*R
1095 PRINT "CODE, LINE, GLOSS, PLACES   ";
1097 PRINT F5$;Z7;G1;A1
1098 A2=A1
1100 MAT N=ZER(2,3)
1110 FOR I=1 TO 3
1115 FOR J=1 TO 3
1120 N(1,I)=N(1,I)+G(I,J)/(Z(1,15+J)*3)
1122 NEXT J
1130 NEXT I
1140 MAT X=M*R
1142 X(1,1)=X(4,1)
1143 X(2,1)=X(5,1)
1144 X(3,1)=X(6,1)
1150 T1=X(2,1)
1160 X(2,1)=1.0216*X(1,1)
1165 X(3,1)=.8467*X(3,1)
1170 X(2,1)=(X(2,1)-.2*X(3,1))/.8
1190 X(1,1)=T1
1200 FOR I=1 TO 3
1210 N(2,I)=X(I,1)
1220 NEXT I
1230 FOR J=1 TO 31
1240 Z1=1.275*B(1,J)+B(2,J)+.8467*B(3,J)
1250 S1=N(1,1)*B(2,J)/N(2,1)
1260 S2=N(1,2)*1.275*B(1,J)/N(2,2)
1270 S3=N(1,3)*.8467*B(3,J)/N(2,3)
1280 S=(S1+S2+S3)/Z1
1290 A(J,1)=R(J,1)*S
1300 A(J,2)=R(J,1)-A(J,1)
1310 NEXT J
1400 GO TO 240
2000 REM READ PIGMENT CONSTANTS ETC
2003 FOR I=1 TO 7
2004 C(100+I)=0
2005 NEXT I
2008 V3=0
2009 FOR L=1 TO V1
```

MFORM

APPENDIX D—CONTINUED

```
2010 FOR I=1 TO N5
2012 IF P$(I)=U$(L) THEN 2020
2015 NEXT I
2017 GO TO 2025
2020 C(100+I)=C(L)
2022 V3=V3+1
2024 IF V3=N5 THEN 2027
2025 NEXT L
2027 FOR I=1 TO N5
2028 IFC(100+I)>0 THEN 2034
2030 PRINT P$(I)," NOT IN THE FILE"
2032 GO TO 99000
2034 NEXT I
2036 FOR I=1 TO N5
2037 SET W4 TO C(100+I)
2038 READ:4,P$(I)
2039 MAT READ:4,Q(2,31)
2040 FOR J=1 TO 31
2050 K(I,J)=Q(1,J)
2060 S(I,J)=Q(2,J)
2070 NEXT J
2080 READ:4,P1,D1,N
2081 V5=0
2082 MAT READ:4,Q(1,N)
2083 V4=LEN(P$(I))
2084 IF V4<5 THEN 2086
2085 V5=1
2086 SET W4 TO C(100+I)++82+V5
2090 MAT READ:4,A$(N)
2200 IF Q(1,Z7)>0 THEN 2240
2210 T(1,I)=1
2220 T$(I)=P$(I)
2230 GO TO 2260
2240 T$(I)=A$(Z7)
2250 T(1,I)=Q(1,Z7)
2260 NEXT I
2270 FOR I=1 TO N6
2275 J=N5+I
2280 FILE #2,P$(J)
2285 MAT READ #2,D(3,18)
2287 MAT READ #2,D(3,31)
2290 READ #2,P1,D1,N
2300 MAT READ #2,Q(1,N),A$(N)
2310 IF Q(1,Z7)>0 THEN 2350
2320 T(1,J)=1
2330 T$(J)=P$(J)
2340 GO TO 2370
2350 T$(J)=A$(Z7)
2360 T(1,J)=Q(1,Z7)
2370 FOR L=1 TO 3
2380 FOR K=1 TO 31
2390 F(L+3*(I-1),K)=D(L,K)
2400 NEXT K
2410 NEXT L
2420 NEXT I
2600 RETURN
3000 REM CALCULATE R AND PARTIALS
3005 S8=.01
3007 X1=0
3015 MAT Q=ZER(31,2)
3020 FOR J=1 TO 31
3030 K1=S1=K2=S2=S3=0
3040 FOR M=1 TO N5
3050 K1=K1+P(M,1)*K(M,J)
3060 S1=S1+P(M,1)*S(M,J)
3070 NEXT M
3080 S4=3.35*ABS(S1)
3090 FOR M=1 TO N6
3100 M1=3*M
3110 M2=N5+M
3120 K2=K2+P(M2,1)*F(M1-2,J)
3130 S2=S2+P(M2,1)*F(M1-1,J)
```

MFORM                    APPENDIX D—CONTINUED

```
4155 H(I,1)=0
4160 C1=C1+H(I,1)
4170 NEXT I
4180 P(N7+1,1)=C2=1/(1+C1)
4190 FOR I=1 TO N7
4200 P(I,1)=H(I,1)*C2
4210 NEXT I
4300 RETURN
5000 REM CALC LEAST SQUARES SOLN
5010 FOR I=1 TO 31
5020 Y(I,1)=A(I,1)-J(I,1)
5025 Y(31+I,1)=A(I,2)-J(I,2)
5030 NEXT I
5100 MAT U=TRN(V)
5110 MAT E=U*V
5120 MAT W=INV(E)
5130 MAT V=ZER(N7,I1)
5140 MAT V=W*U
5150 MAT H=V*Y
5160 MAT V=ZER(I1,N7)
5200 RETURN
7000 REM ZERO MATRICES
7010 MAT V=ZER(I1,N7)
7020 MAT E=ZER(N7,N7)
7030 MAT H=ZER(N7,1)
7040 MAT U=ZER(N7,I1)
7050 MAT W=ZER(N7,N7)
7060 MAT Y=ZER(I1,1)
7100 RETURN
8000 REM CONVERT DELTA X,Y,Z TO L,A,B
8010 FOR I=1 TO 2
8020 FOR J=0 TO 3 STEP 3
8030 T1=L(J+2,I)↑(1/3)
8040 A1=1.0216*L(J+1,I)
8050 L(J+1,I)=25.29*T1-18.38
8060 L(J+2,I)=106*(A1↑(1/3)-T1)
8065 A1=.8467*L(J+3,I)
8070 L(J+3,I)=42.34*(T1-A1↑(1/3))
8090 NEXT J
8100 NEXT I
8110 RETURN
8500 REM CONVERT X,Y,Z VECTORS TO L,A,B VECTORS
8510 FOR I=1 TO 2*N7
8520 I9=1+INT((I-1)/N7)
8530 FOR J=0 TO 3 STEP 3
8540 T1=D(J+2,I)
8550 A1=1.0216*D(J+1,I)
8560 T2=L(J+2,I9)↑(2/3)
8570 A2=L(J+1,I9)↑(2/3)
8580 D(J+1,I)=8.43*T1/T2
8590 D(J+2,I)=35.3*(A1/A2-T1/T2)
8600 B1=D(J+3,I)
8610 B2=L(J+3,I9)↑(2/3)
8620 D(J+3,I)=14.113*(T1/T2-B1/B2)
8630 NEXT J
8640 NEXT I
8650 RETURN
9000 REM IUBROUTINE FOR PLOT
9010 PRINT "PLOT INDECIEI";
9020 INPUT U1,U2,U3,U4
9025 IF U1=2 THEN 240
9030 FOR I=1 TO 31
9040 R(I,1)=(A(I,1)*U1+A(I,2)*U2+J(I,1)*U3+J(I,2)*U4)*10↑(A2-3)
9045 NEXT I
9060 LET C1=511/30
9070 LET C2=511
9090 LET I(0)=4
9100 LET I(1)=16
9110 LET I(2)=64
```

MFORM                   APPENDIX D—CONTINUED

```
3140 S3=S3+P(M2,1)*F(M1,J)
3150 NEXT M
3160 GO SUB 3800
3170 J(J,1)=Q(J,1)
3175 J(J,2)=Q(J,2)
3180 FOR M=1 TO N5
3190 K1=K1+S8*K(M,J)
3195 S1=S1+S8*S(M,J)
3197 S4=3.35*ABS(S1)
3200 GO SUB 3800
3205 IF O<>5 THEN 3220
3207 O(J,M)=(Q(J,1)-J(J,1))/S8
3209 O(J,N7+M)=(Q(J,2)-J(J,2))/S8
3210 GO TO 3280
3220 V(J,M)=(Q(J,1)-J(J,1))/S8
3222 V(31+J,M)=(Q(J,2)-J(J,2))/S8
3280 K1=K1-S8*K(M,J)
3290 S1=S1-S8*S(M,J)
3300 S4=3.35*ABS(S1)
3305 NEXT M
3307 IF N6=1 THEN 3475
3310 FOR M=1 TO N6-1
3320 M1=3*M
3330 M2=N5+M
3340 K2=K2+F(M1-2,J)*S8
3350 S2=S2+F(M1-1,J)*S8
3360 S3=S3+F(M1,J)*S8
3370 GO SUB 3800
3372 IF O<>5 THEN 3380
3374 O(J,M2)=(Q(J,1)-J(J,1))/S8
3375 O(J,M2+N7)=(Q(J,2)-J(J,2))/S8
3377 GO TO 3440
3380 V(J,M2)=(Q(J,1)-J(J,1))/S8
3390 V(J+31,M2)=(Q(J,2)-J(J,2))/S8
3440 K2=K2-F(M1-2,J)*S8
3450 S2=S2-F(M1-1,J)*S8
3460 S3=S3-F(M1,J)*S8
3470 NEXT M
3475 X1=X1+(A(J,1)-J(J,1))↑2+(A(J,2)-J(J,2))↑2
3480 NEXT J
3500 RETURN
3800 REM CALC REFLECTANCE
3810 S=S1+S2+S3
3820 L=K1+K2+S
3830 A=(L↑2-S↑2)↑.5
3840 L1=A+L+S4
3850 L2=L+S4
3860 R1=((S1+S3)/L1)+S*S4/(L1*(A+L))
3870 Q(J,1)=(C3*R1-C4)/(1-C5*R1)
3880 Q(J,2)=S2/L2
3890 RETURN
4000 REM CALC FIRST GUESS
4010 I1=F(3*N6-1,I)
4050 A1=A(I,2)
4060 FOR J=1 TO N5
4070 V(I,J)=A1*(S(J,I)+3.35*ABS(S(J,I))+K(J,I))/F1
4080 NEXT J
4085 IF N6=1 THEN 4100
4090 FOR J=1 TO N6-1
4095 V(I,J+N5)=F(3*J-1,I)/F1
4097 NEXT J
4100 N=3*N6
4110 Y(I,1)=1-A1*(F1+F(N,I)+F(N-2,I))/F1
4120 NEXT I
4130 GOSUB 5100
4140 C1=0
4150 FOR I=1 TO N7
4152 IF H(I,1)>0 THEN 4160
```

MFORM                    APPENDIX D—CONTINUED

```
9120 LET I(3)=INT(R(1,1)*C2/8)
9130 LET I(4)=64
9135 PRINT
9140 CHANGE I TO I$
9145 PRINT I$
9150 LET I(0)=10
9155 FOR J= 0 TO 9
9160 FOR I=1 TO 3
9165 LET I(3*I-1)=INT((3*J+I)*C1/8)
9170 LET I(3*I)=INT(R(3*J+I,1)*C2/8)
9175 LET I(3*I+1)=INT((3*J+I)*C1-I(3*I-1)*8)*8
9176 LET I(3*I+1)=I(3*I+1)+INT(R(3*J+I,1)*C2-I(3*I)*8)
9180 NEXT I
9185 CHANGE I TO I$
9190 PRINT I$
9200 NEXT J
9210 LET I(0)=4
9220 LET I(2)=64
9230 LET I(3)=64
9240 LET I(4)=64
9250 CHANGE I TO I$
9260 PRINT I$
9270 GO TO 9010
10000 REM PRINT RESULTS
10010 PRINT C$
10020 T1=0
10030 FOR I=1 TO N7+1
10040 T1=T1+P(I,1)/T(1,1)
10050 NEXT I
10055 FOR I=1 TO N7+1
10060 PRINT P$(I);TAB(8);INT(P(I,1)*10↑3+.5)/10↑3;TAB(15);
10070 PRINT T$(I);TAB(22);INT((P(I,1)/(T(1,1)*T1))*10↑3+.5)/10↑3
10080 NEXT I
10090 PRINT "SUM OF SQUARES=";X1
11000 RETURN
99000 END.
```

MSHADE                          APPENDIX E

```
100 FILES MLAB;MVEC
110 PRINT "SPADE, VECTOR FILE NAMES";
120 INPUT F1$,F2$
130 IF F1$="MLAB" THEN 140
135 FILE #1,F1$
140 IF F2$="MVEC" THEN 150
145 FILE #2,F2$
150 DIM A(12,10),B(10,12),C(10,10),D(10,10),E(10,12)
160 DIM F(10,1),G(12,1),H(12,1),L(12,1),V(12,10)
170 DIM J(10),Y(1,12),Z(1,12),M(4,3),I(1,10)
180 DIM K(1,12),N(1,4),P(1,4),U(1,4)
190 DIM P$(10)
210 RESTORE #1
220 PRINT "SET";
230 INPUT N9
240 FOR I=1 TO N9
250 READ #1,C$,B,N
260 MAT READ #1,P(1,N),M(2*N,3)
270 IF END #1 THEN 210
280 NEXT I
290 RESTORE #2
300 FOR I=1 TO 50
310 READ #2,C1$,N1,N3,Z
315 N2=3*N3
317 MAT READ #2,N(1,N3)
320 MAT READ #2,P$(N1)
330 MAT READ #2,V(N2,N1)
340 IF C1$=C$ THEN 390
```

MSHADE

```
350 IF END #2 THEN 370
360 NEXT I
370 PRINT C$,"NOT IN FILE",F2$
380 GO TO 210
390 IF N=N3 THEN 400
395 PRINT "MISMATCH ON ANGLES"
397 GO TO 210
400 FOR I=1 TO 2*N3
410 T1=M(I,1)↑(1/3)
420 M(I,1)=25.29*T1-18.38
430 A=M(I,2)*.8+M(I,3)*.2
450 M(I,2)=106*(A↑(1/3)-T1)
460 M(I,3)=42.34*(T1-M(I,3)↑(1/3))
470 NEXT I
480 PRINT "TOLERANCE":
490 MAT INPUT T(1,N3)
500 MAT L=ZER(3*N3,1)
510 FOR I=1 TO N3
515 I1=3*(I-1)
520 FOR J=1 TO 3
525 L(I1+J,1)=M(I,J)-M(N3+I,J)
527 NEXT J
530 NEXT I
540 LET A7=1
550 MAT K=TRN(L)
560 PRINT "CODE=   ";C$
565 MAT P=ZER(1,N3)
570 FOR I=1 TO N3
575 I1=3*(I-1)
577 P(1,I)=(K(1,I1+1)↑2+K(1,I1+2)↑2+K(1,I1+3)↑2)↑.5
580 NEXT I
590 PRINT "ANGLE      DL     DA     DB     DE"
600 FOR I=1 TO N3
602 PRINT N(1,I):
605 I1=3*(I-1)
610 FOR J=1 TO 3
612 PRINT INT(K(1,I1+J)*10↑3+.5)/10↑3;
614 NEXT J
615 PRINT INT(P(1,I)*10↑3+.5)/10↑3
620 NEXT I
630 PRINT
650 FOR I=1 TO N1
670 PRINT TAB(9*(I-1));P$(I);
680 NEXT I
690 PRINT TAB(9*N1);"DE"
760 FOR I=1 TO N1-1
770 IF I>N2 THEN 210
780 MAT A=ZER(N2,1)
790 MAT B=ZER(1,N2)
800 MAT C=ZER(1,1)
810 MAT D=ZER(1,1)
820 MAT E=ZER(1,N2)
830 MAT F=ZER(1,1)
840 MAT G=ZER(N2,1)
850 MAT H=ZER(N2,1)
860 MAT Z=ZER(1,1)
870 REM LINES FOLLOWING THRU SUB GENERATE THE COMBINATIONS
880 REM OF 1 THRU N2 PIG. TAKEN FROM A SET OF N1 PIG.
890 FOR J1=1 TO N1+1-I
900 LET J(1)=J1
910 IF I>1 THEN 930
920 GO SUB 1250
925 GO TO 1210
930 FOR J2=J1+1 TO N1+2-I
940 LET J(2)=J2
950 IF I>2 THEN 980
960 GO SUB 1250
970 GO TO 1200
980 FOR J3=J2+1 TO N1+3-I
```

MSHADE APPENDIX E—CONTINUED

```
990 LET J(3)=J3
1000 IF I>3 THEN 1030
1010 GO SUB 1250
1020 GO TO 1190
1030 FOR J4=J3+1 TO N1+4-I
1040 LET J(4)=J4
1050 IF I>4 THEN 1080
1060 GO SUB 1250
1070 GO TO 1180
1080 FOR J5=J4+1 TO N1+5-I
1090 LET J(5)=J5
1100 IF I>5 THEN 1130
1110 GO SUB 1250
1120 GO TO 1170
1130 FOR J6=J5+1 TO N1+6-I
1140 LET J(6)=J6
1150 GO SUB 1250
1160 NEXT J6
1170 NEXT J5
1180 NEXT J4
1190 NEXT J3
1200 NEXT J2
1210 NEXT J1
1230 NEXT I
1240 GO TO 210
1250 REM SUB FOR LEAST SQUARE FITS
1260 FOR C=1 TO I
1270 FOR R=1 TO N2
1280 LET A(R,C)=V(R,J(C))
1290 NEXT R
1300 NEXT C
1310 IF I<>N2 THEN 1340
1320 MAT E=INV(A)
1330 GO TO 1380
1340 MAT B=TRN(A)
1350 MAT C=B*A
1360 MAT D=INV(C)
1370 MAT E=D*B
1380 MAT F=E*L
1390 MAT G=A*F
1400 FOR Q=1 TO N2
1410 LET H(Q,1)=K(1,Q)-G(Q,1)
1420 NEXT Q
1430 MAT U=ZER(1,N3)
1435 FOR C=1TO N3
1440 FOR Q=1 TO 3
1450 U(1,C)=U(1,C)+H(Q+3*(C-1),1)↑2
1470 NEXT Q
1474 LET U(1,C)=U(1,C)↑.5
1475 NEXT C
1510 E1=0
1520 FOR C=1 TO N3
1530 IF U(1,C)<T(1,C) THEN 1534
1532 LET E1=1
1534 NEXT C
1536 IF E1=1 THEN 1680
1540 FOR Q=1 TO I
1550 IF F(Q,1)<0 THEN 1680
1560 NEXT Q
1570 FOR Q=1 TO I
1580 LET I(1,Q)=J(Q)
1590 LET Z(1,Q)=F(Q,1)
1600 NEXT Q
1610 PRINT
1620 LET B1=B/Z
1630 FOR Q=1 TO I
1640 PRINT TAB(9*(I(1,Q)-1));INT(Z(1,Q)*B1*A7*10↑3+.5)/10↑3;
1650 NEXT Q
1665 FOR Q=1 TO N3
```

MSHADE APPENDIX E—CONTINUED

```
1570 PRINT TAB(9*N1+4*(Q-1));INT(U(1,Q)*10↑2+.5)/10↑2;
1675 NEXT Q
1677 PRINT
1680 RETURN
1690 END
```

METVEC APPENDIX F

```
100 FILES MVDATA;MVEC;CERGLOSS;NLAND
110 DIM A(3,10),B(9,10),C(5,10),D(3,21),E(1,31)
120 DIM F(9,31),G(4,3),H(1,10),I(1,10),J(4,3)
130 DIM K(7,21),L(4,3),M(3,31),N(1,4)
140 DIM Q(31,2),S(7,21),T(1,10)
150 DIM V(10,10),X(4,3),Y(3,2),Z(1,10)
160 DIM A$(10),B$(10)
170 DIM P$(10),T$(10)
171 DIM U(100),U$(100)
172 SET W 4 TO 1
173 READ :4,V1,V2
174 SET W4 TO 901
175 FOR I=1 TO V1
176 READ :4,U$(I),U(I)
177 NEXT I
180 C3=.578
190 C4=.005
200 C5=.4
210 MAT READ #3,Z
220 SET W4 TO 104
222 MAT READ:4,M
230 REM READ MVDATA FILE
240 GOSUB 1000
250 REM READ PIG. CONSTANTS, GLOSS, GROMETRIC FACTORS
260 REM TRISTIMULUS VALUES, AND CALC. PIG. CONCENTRATIONS
270 GO SUB 2000
280 REM CONVERT EXP GRB TO LAB AND PRINT
285 GOSUB 4000
290 PRINT "ANGLE   G    R    B    L    A    B"
300 PRINT "EXP."
310 GOSUB 5000
320 REM CALCULATE AVERAGE ANGULAR FACTOR
330 GOSUB 6000
340 REM CALCULATE COLOR COORDINATES OF FORMULA
350 GOSUB 3000
360 MAT Y=M*Q
370 REM CONVERT XYZ DIF AND ANGULAR INTO GRB AT ALL ANGLES
380 GOSUB 7000
390 REM CONVERT GRB TO LAB AT ALL ANGLES
400 GO SUB 4000
410 PRINT "THEO."
420 GOSUB 5000
430 REM CALC. VECTORS
440 MAT V=ZER(3*N3,N7)
450 MAT J=L
452 S9=0
453 FOR I=1 TO N7
454 S9=S9+C(5,I)
455 NEXT I
460 FOR V=1 TO N7
470 C(5,V)=C(5,V)+.01*S9
480 GOSUB 3000
490 MAT Y=M*Q
500 GOSUB 7000
510 GOSUB 4000
515 C(5,V)=C(5,V)-.01*S9
520 FOR I=1 TO N3
525 I1=3*(I-1)
530 FOR J= 1 TO 3
```

APPENDIX F—CONTINUED

METVEC

```
540 V(I1+J,V)=(L(I,J)-J(I,J))/(.01*S9)
545 V(I1+J,V)=V(I1+J,V)*T(I,V)
550 NEXT J
560 NEXT I
570 NEXT V
580 REM WRITE VECTORS TO FILES
590 PRINT "VECTOR FILE NAME, SCRATCH";
600 INPUT C1$,C2$
610 FILE #2,C1$
620 IF C2$="YES" THEN 650
630 APPEND #2
640 GO TO 700
650 SCRATCH #2
700 WRITE #2,F5$;N7;N3;100
710 MAT WRITE #2,N;
720 FOR I=1 TO N7
730 WRITE #2,T$(I);
740 NEXT I
745 WRITE #2
750 MAT WRITE #2,V;
760 GO TO 230
1000 REM READ INPUT DATA
1010 READ#1,F5$,Z7,N5,N6,N3
1020 REM F5=CODE, Z7=LINE, N5=NO. OF SOLID PIGMENTS
1030 REM N6=NO. OF METALLIC PIG., N3=NO. OF ANGLES
1040 IF END #1 THEN 9000
1050 MAT READ #1,N(1,N3)
1060 REM MAT N= ANGLES IN DEGREES
1070 MAT READ #1,G(N3,3)
1080 N7=N5+N6
1090 FOR I=1 TO N7
1100 READ #1,P$(I),B$(I),C(1,I),C(2,I)
1110 NEXT I
1120 PRINT "CODE, LINE ";F5$;Z7
1200 RETURN
2000 REM READ PIGMENT CONSTANTS ETC
2003 FOR I=1 TO 7
2004 U(100+I)=0
2005 NEXT I
2008 V3=0
2009 FOR L=1 TO V1
2010 FOR I=1 TO N5
2012 IF P$(I)=U$(L) THEN 2020
2015 NEXT I
2017 GO TO 2025
2020 U(100+I)=U(L)
2022 V3=V3+1
2024 IF V3=N5 THEN 2027
2025 NEXT L
2027 FOR I=1 TO N5
2028 IF U(100+I) > 0 THEN 2034
2030 PRINT P$(I), " NOT IN THE FILE"
2032 GO TO 9000
2034 NEXT I
2036 FOR I=1 TO N5
2037 SET W4 TO U(100+I)
2038 READ:4,P$(I)
2039 MAT READ:4,Q(2,31)
2040 FOR J=1 TO 31
2050 K(I,J)=Q(1,J)
2060 S(I,J)=Q(2,J)
2070 NEXT J
2080 READ:4,P1,D1,N
2081 V5=0
2082 MAT READ:4,I(1,N)
2083 V4=LEN(P$(I))
2084 IF V4<5 THEN 2086
2085 V5=1
2086 SET W4 TO U(100+I)+82+V5
2090 MAT READ:4,A$(N)
2200 IF I(1,Z7)>0 THEN 2240
```

METVEC  APPENDIX F—CONTINUED

```
2210 T(1,I)=1
2220 T$(I)=P$(I)
2230 GO TO 2260
2240 T$(I)=A$(Z7)
2250 T(1,I)=I(1,Z7)
2260 NEXT I
2270 FOR I=1 TO N6
2275 J=N5+I
2280 FILE #2,P$(J)
2282 REMMAT A CONTAINS ANGULAR FACTORS
2285 MAT READ #2,A,D
2290 READ #2,P1,D1,N
2300 MAT READ #2 ,I(1,N),A$(N)
2310 IF I (1,Z7) >0 THEN 2350
2320 T(1,J)=1
2330 T$(J)=P$(J)
2340 GO TO 2370
2350 T$(J)=A$(Z7)
2360 T(1,J)=I(1,Z7)
2370 FOR L=1 TO 3
2380 FOR K=1 TO 31
2390 F(L+3*(I-1),K)=D(L,K)
2400 NEXT K
2410 NEXT L
2411 FOR L=1 TO 3
2412 FOR K=1 TO 18
2413 B(L+3*(I-1),K)=A(L,K)
2415 NEXT K
2417 NEXT L
2420 NEXT I
2430 FOR I=1 TO N7
2440 C(4,I)=C(2,I)*T(1,I)
2450 IF B$(I)="T" THEN 2480
2460 C(3,I)=C(1,I)
2470 GO TO 2490
2480 C(3,I)=C(1,I)*T(1,I)
2490 C(5,I)=C(3,I)+C(4,I)
2495 NEXT I
2600 RETURN
3000 REM CALCULATE REFLECTANCE
3005 J1=5
3007 MAT Q=ZER(31,2)
3010 FORJ=1 TO 31
3020 S1=K1=K2=S2=K3=S3=S4=S5=0
3030 FOR M=1 TO N5
3040 K1=K1+C(J1,M)*K(M,J)
3050 S1=S1+C(J1,M)*S(M,J)
3060 NEXT M
3070 FOR M=1 TO N6
3075 C9=C(J1,N5+M)
3077 M1=3*M
3080 K2=K2+C9*F(M1-2,J)
3090 S2=S2+C9*F(M1-1,J)
3100 S3=S3+C9*F(M1,J)
3120 NEXT M
3130 S4=3.35*ABS(S1)
3132 S=S1+S2+S3
3135 L=K1+K2+S
3140 A=(L↑2-S↑2)↑.5
3150 L1=A+L+S4
3160 L2=L+S4
3220 R1=((S1+S3)/L1)+S*S4/(L1*(A+L))
3230 Q(J,1)=(C3*R1-C4)/(1-C5*R1)
3240 Q(J,2)=S2/L2
3250 NEXT J
3300 RETURN
4000 REM CONVERT GRB TO LAB AT ALL ANGLES
4010 FOR I=1 TO N3
4020 A=.8*G(I,2)+.2*G(I,3)
4030 T1=G(I,1)↑(1/3)
```

METVEC  APPENDIX F—CONTINUED

```
4040 L(I,1)=25.29*T1-18.38
4050 L(I,2)=106*(A↑(1/3)-T1)
4060 L(I,3)=42.34*(T1-G(I,3)↑(1/3))
4070 NEXT I
4080 RETURN
5000 REM PRINT GRB,LAB AT ALL ANGLES
5010 FOR I=1 TO N3
5020 PRINT N(1,J);
5030 FOR J=1 TO 3
5040 PRINT INT(G(I,J)*10↑2+.5)/10↑2;
5050 NEXT J
5060 FOR J=1 TO 3
5070 PRINT INT(L(I,J)*10↑2+.5)/10↑2;
5080 NEXT J
5085 PRINT
5090 NEXT I
5100 RETURN
6000 REM CALC AVG ANGLUAR FACTOR
6005 MAT O=ZER(1,N6)
6007 MAT A=ZER(3,18)
6010 FOR I=1 TO N6
6020 FOR J=1 TO 31
6040 O(1,I)=O(1,I)+F(3*I-1,J)
6050 NEXT J
6060 NEXT I
6065 REM MAT O CONTAINS AVERAGE ANG SCATTER VALUE FOR EACH METALLIC
6070 MAT O=(1/31)*O
6080 D=0
6085 FOR I=1 TO N6
6090 O(1,I)=O(1,I)*C(5,N5+I)
6100 D=D+O(1,I)
6105 NEXT I
6110 MAT O=(1/D)*O
6112 REM MAT O CONTAINS THE CONC. WEIGHTED FRAC. OF ANG. SCATTER
6113 REM OF EACH METALLIC
6115 FOR K=1 TO 3
6120 FOR I=1 TO 18
6130 FOR J=1 TO N6
6140 A(K,I)=A(K,I)+B(K+3*(J-1),I)*O(1,J)
6150 NEXT J
6160 NEXT I
6170 NEXT K
6175 REM MAT A CONTAINS THE CONC-SCATTER WEIGHTED AVERAGE FOR ALL MET.
6200 RETURN
7000 REM CONVERT XYZ DIFF AND ANG TO GRB AT ALL ANGLES
7010 FOR I=1 TO N3
7020 J=1+N(1,I)/5
7030 G(I,1)=Y(2,1)*Z(1,J)+Y(2,2)*A(1,J)
7040 G(I,2)=1.0215*(Y(1,1)*Z(1,J)+Y(1,2)*A(2,J))
7050 G(I,3)=.3467*(Y(3,1)*Z(1,J)+Y(3,2)*A(3,J))
7060 G(I,2)=(G(I,2)-.2*G(I,3))/.8
7070 NEXT I
7100 RETURN
8000 END
```

Appendix 1

MVDATA

```
100    4320-68,2,3,1,2,0,60
110    23.68,25.18,24.58
120    6.84,7.45,7.15
130    R437,T,1,.49
```

Appendix 1 -Continued

```
140   R650,T,.5,.38
150   N131,T,.5,.4
160   M404,T,15.6,0
200   4320-69,2,4,1,2,0,60
210   24.19,30.06,7.78
220   10.04,12.7,2.9
230   Y417,T,13.81,0
240   Y304,T,.5,.35
250   Y103,T,2.68,1
260   W272,T,0,.24
270   M404,T,6.4,0
300   4320-71,2,5,1,2,0,60
310   11.64,6.2,18,3.5,1.71,5.89
320   G216,T,2,.6
330   L122,T,4,0
340   Y417,T,0,1
350   N131,T,0,.5
360   W272,T,0,.3
370   M404,T,6.6,0
```

READY

APPENDIX 2

METVEC

```
CØDE. LINE  4320-68  2
ANGLE   G       R       B       L       A       B
EXP.
  0   23.68   25.18   24.58   54.24   5.8   -1.52
 60    6.84    7.45    7.15   29.63   5.25  -1.2
THEØ.
  0   19.45   21.71   20.75   49.64   9.73  -2.47
 60    5.87    6.64    6.21   27.24   7.19  -1.47
VECTØR FILE NAME, SCRATCH? MVEC,YES
CØDE, LINE  4320-69  2
ANGLE   G       R       B       L       A       B
EXP.
  0   24.19   30.06    7.78   54.76   5.86   38.55
 60   10.04   12.7     2.9    36.18   5.2    30.96
THEØ.
  0   23.22   29.3     6.57   53.77   6.52   41.5
 60    9.13   11.54    2.43   34.47   4.66   31.54
VECTØR FILE NAME, SCRATCH? MVEC,NØ
CØDE, LINE  4320-71  2
ANGLE   G       R       B       L       A       B
EXP.
  0   11.64    6.2    18      38.93  -23.39  -15.01
 60    3.5     1.71    5.89   20.02  -16.2   -12.18
THEØ.
  0    9.49    4.39   15.6    35.17  -25.26  -16.14
 60    3.01    1.42    5.07   18.15  -16.35  -11.57
VECTØR FILE NAME, SCRATCH? MVEC,NØ
```

USED    6.00 UNITS

APPENDIX 3

MLAB

```
100  4320-68,100,2,0,60
110  23.68,25.18,24.58,6.84,7.45,7.15
120  27.74,28.74,29.09,8.02,8.49,8.51
200  4320-69,100,2,0,60
210  24.19,30.06,7.78,10.04,12.7,8.9
220  24.6,29.65,8.27,9.9,12.13,2.98
300  4320-71,100,2,0,60
310  11.64,6.2,18,3.5,1.71,5.89
320  13.7,6.8,24.44,3.86,1.76,7.52
```

MVEC

```
100  4320-68, 4 , 2 , 100 ,
110  0 , 60 ,
```

```
MVEC                APPENDIX 3 -Continued

120 TDR-10,TDR-12 ,TBN-35 ,TBM-10 ,
130 -3.37798 ,-2.69262 ,-2.90812 , 0.657031 ,
140  3.48102 , 2.88037 ,-2.16714 ,-0.360597 ,
150 -2.65893 , 3.23866 , 1.54201 ,-2.32852E-2 ,
160 -2.19461 ,-1.75103 ,-2.00801 , 0.434806 ,
170  2.45397 , 1.94761 ,-1.63249 ,-0.242081 ,
180 -1.7446  , 2.20313 , 0.963981 ,-1.63397E-2 ,
190 4320-69, 5 , 2 , 100 ,
200  0 , 60 ,
210 TBY-87 ,TBY-89 ,TBY-90 ,TBW-44 ,TBM-10 ,
220 -7.37392E-2 ,-2.52388 ,-0.198259 , 1.05204 , 0.570164 ,
230  0.049856 , 5.71452 , 0.201864 ,-0.487112 ,-0.939329 ,
240  0.541538 ,-2.65896 , 0.791472 ,-1.17017 ,-1.2021 ,
250 -0.057574 ,-1.53399 , 0.285331 , 2.07255 , 0.112785 ,
260 -5.42867E-2 , 5.28231 , 0.323819 , 0.252055 ,-0.764357 ,
270  0.346369 ,-1.60054 , 0.923948 ,-1.62122E-4 ,-1.04847 ,
280 4320-71, 6 , 2 , 100 ,
290  0 , 60 ,
300 TBG-22 ,TBL-41 ,TBY-87 ,TBN-35 ,TBW-44 ,TBM-10 ,
310 -0.552768 ,-1.67353 ,-0.408941 ,-3.53626 , 0.148511 , 1.58217 ,
320 -1.84032 , 1.29619 ,-1.29318 , 4.01527 , 2.47736 ,-0.295509 ,
330  1.63955 ,-2.04029 , 2.61561 , 3.42269 , 0.415133 ,-0.101334 ,
340 -0.387038 ,-1.13351 ,-0.249662 ,-2.4962 , 2.13824 , 0.990415 ,
350 -1.23042 , 1.01255 ,-1.01298 , 2.81021 ,-1.98329E-2 ,-0.198953 ,
360  1.12337 ,-1.39371 , 1.83021 , 2.48092 ,-1.16031 ,-2.55142E-2 ,
```

APPENDIX 4

MSHADE1    14:47EDT    09/30/71

SHADE, VECTOR FILE NAMES? MLAB,MVEC
SET? 1
TOLERANCE? 5,5
CODE= 4320-68

| ANGLE | DL | DA | DB | DE |
|---|---|---|---|---|
| 0 | -3.934 | 1.728 | 0.525 | 4.328 |
| 60 | -2.616 | 1.154 | 0.496 | 2.902 |

| TDR-10 | TDR-12 | TBN-35 | TBM-10 | DE | |
|---|---|---|---|---|---|
| 0.576 | | | | 2.87 | 2.04 |
| | 0.667 | | | 2.7 | 1.75 |
| | | 0.533 | | 3.75 | 2.55 |
| 0.403 | 0.504 | | | 1.66 | 1.18 |
| 0.619 | | 0.616 | | 1.52 | 1.17 |
| | 0.595 | 0.301 | | 2.46 | 1.55 |
| 0.483 | 0.362 | 0.457 | | 0.07 | 0.1 ←|

SET? 2
TOLERANCE? 5,5
CODE= 4320-69

| ANGLE | DL | DA | DB | DE |
|---|---|---|---|---|
| 0 | -0.411 | 2.661 | 1.038 | 2.885 |
| 60 | 0.255 | 2.171 | 0.977 | 2.394 |

| TBY-87 | TBY-89 | TBY-90 | TBW-44 | TBM-10 | DE | |
|---|---|---|---|---|---|---|
| 2.165 | | | | | 2.57 | 2.33 |
| | 0.291 | | | | 2.1 | 1.72 |
| | | 1.785 | | | 2.33 | 1.75 |
| 3.643 | 0.37 | | | | 0.87 | 1.19 |
| 2.188 | | | 0.011 | | 2.57 | 2.33 |
| | 0.307 | 1.902 | | | 0.97 | 0.35 |
| 0.575 | 0.318 | 1.664 | | | 0.94 | 0.4 |
| 5.298 | 0.441 | | 0.662 | | 0.46 | 0.18 |
| | 0.311 | 1.927 | 0.072 | | 0.96 | 0.33 ←|
| 14.646 | 0.875 | | 1.157 | 2.642 | 0.16 | 0.15 |

SET? 3
TOLERANCE? 1.5,1.5
CODE= 4320-71

| ANGLE | DL | DA | DB | DE |
|---|---|---|---|---|
| 0 | -3.199 | -0.595 | 6.553 | 7.317 |
| 60 | -1.274 | -1.289 | 4.355 | 4.717 |

| TBG-22 | TBL-41 | TBY-87 | TBN-35 | TBW-44 | TBM-10 | DE | |
|---|---|---|---|---|---|---|---|
| 2.177 | | | 0.671 | | | 1.06 | 1.36 |
| | | 1.94 | 0.447 | | | 0.83 | 0.73 |
| 0.569 | | 1.462 | 0.502 | | | 0.61 | 0.79 |
| 2.539 | | | 0.645 | 0.552 | | 0.42 | 0.56 |
| 2.233 | | | 0.819 | | 0.882 | 0.69 | 1.03 |
| | 0.33 | 2.222 | 0.378 | | | 0.54 | 0.76 |
| | 1.34 | 3.411 | | 0.63 | | 0.63 | 1.12 |
| | | 1.991 | 0.436 | 0.121 | | 0.89 | 0.55 |
| 1.58 | | 0.782 | 0.562 | 0.402 | | 0.2 | 0.26 |
| 2.505 | | | 0.729 | 0.455 | 0.475 | 0.22 | 0.32 |
| | 0.687 | 2.675 | 0.269 | 0.353 | | 0.13 | 0.18 metameric |

APPENDIX 5

```
MRDATA 45     1    95    3
0.4        0.32  0.26
0.28       0.26  0.2
0.7        0.55  0.44
56    56    59    61    62   63   64   64   63   62   62   59   55   52   48   42   38   34
33    33    32    31    31   34   35   37   38   38   38   36   35
44     1    95    3
1.62       1.24  0.94
2.2        1.69  1.25
2.2        1.73  1.3
159   165  167   164   156  146  138  126  113  108  105   95   84   85   90
81    75    91   123   148  161  166  170  175  182  186  189  189  188  183
183
43     1    95    3
1.24       0.91  0.66
1.04       0.78  0.66
2.62       1.92  1.38
201        217   228   236  240  241  238  229  217  209  204  187  168  160
153        131   113   108  112  113  113  112  115  123  134  144  150  151
145        139   136
41     1    95    3
4.76       3.62  2.62
5.22       4.11  3.12
4.36       3.35  2.44
329        327   327   327  325  323  327  328  334  339  341  338  335  340
347        342   337   348  365  374  377  377  377  377  377  373  371  369
369        366   362
38     1    95    3
3.86       2.86  2.06
3     2.34        1.78
5.15  3.92        2.88
314   323   335   347  356  365  374  381  385  386  385  380  374  364
352   335   315   297  283  271  257  247  243  245  248  252  257  264
269   270   271
```

APPENDIX 6

```
MFORM        13:10EDT       10/08/71

DATA FILE? MRDATA
OPTION? 1
SET? 1
CODE, LINE, GLOSS, PLACES  45 1 95 3
OPTION? 3
NO OF PIG? 4,1
PIG CODES? W272,N131,L112,R434,M404
SPECTRAL MATCH
W272    0.053    TGW-02    0.013
N131    0.141    TGN-01    0.249
L112    0.348    TGL-03    0.412
R434    0.093    TGR-06    0.093
M404    0.366    TGM-03    0.234
SUM OF SQUARES= 1.05438E-4
OPTION? 2
CODE, LINE, GLOSS, PLACES  44 1 95 3
OPTION? 4
SPECTRAL MATCH
W272    0.259    TGW-02    0.093
N131    0.019    TGN-01    0.048
L112    0.028    TGL-03    0.048
R434    0.345    TGR-06    0.494
M404    0.349    TGM-03    0.317
SUM OF SQUARES= 5.55901E-4
OPTION? 2
CODE, LINE, GLOSS, PLACES  43 1 95 3
OPTION? 4
SPECTRAL MATCH
```

APPENDIX 6-continued

```
W272    0.045    TGW-02    0.015
N131    0.022    TGN-01    0.051
L112    0.151    TGL-03    0.23
R434    0.129    TGR-06    0.167
M404    0.653    TGM-03    0.537
SUM OF SQUARES= 1.68024E-3
OPTION? 2
CODE, LINE, GLOSS, PLACES  41 1 95 3
OPTION? 3
NO OF PIG? 3,1
PIG CODES? W272,Y417,R434,M404
SPECTRAL MATCH
W272    0.226    TGW-02    0.095
Y417    0.066    TGY-06    0.13
R434    0.029    TGR-06    0.048
M404    0.68     TGM-03    0.726
SUM OF SQUARES= 6.97066E-3
OPTION? 2
CODE, LINE, GLOSS, PLACES  38 1 95 3
OPTION? 4    3
NO OF PIG? 3,1
PIG CODES? W272,L112,G216,M404
SPECTRAL MATCH
W272    0.182    TGW-02    0.077
L112    0.029    TGL-03    0.058
G216    0.034    TGG-01    0.055
M404    0.755    TGM-03    0.811
SUM OF SQUARES= 3.06947E-3
```

APPENDIX 7

COMPARISON OF EXPERIMENTAL AND PREDICTED PIGMENT COMPOSITIONS FOR LEAST SQUARE SPECTRAL MATCHES

| PANEL NUMBER | 45 | | 44 | | 43 | | 41 | | 38 | |
|---|---|---|---|---|---|---|---|---|---|---|
| PIGMENT CODE | Exp. | Pred. | Exp. | Pred. | Exp. | Pred. | Exp. | Pred. | Exp. | Pred. |
| W272 | .156 | .053 | .268 | 259 | .069 | .045 | .160 | .226 | .167 | .182 |
| N131 | .118 | .141 | .011 | .019 | .006 | .022 | | | | |
| L112 | .422 | .348 | .023 | .028 | .134 | .151 | | | .028 | .029 |
| G216 | | | | | | | | | .034 | .034 |
| Y417 | | | | | | | .077 | .066 | | |
| R434 | .104 | .093 | .356 | .345 | .131 | .129 | .026 | .029 | | |
| M404 | .200 | .366 | .342 | .349 | .660 | .653 | .737 | .680 | .771 | .755 |

APPENDIX 7A

COMPARISON OF EXPERIMENTAL AND PREDICTED PIGMENT COMPOSITIONS FOR LEAST SQUARE SPECTRAL MATCHES

WGT. Fraction Pigment

| Panel Number PIGMENT CODE | 45 Exp. | Pred. | 44 Exp. | Pred. | 43 Exp. | Pred. | 41 Exp. | Pred. | 38 Exp | Pred. |
|---|---|---|---|---|---|---|---|---|---|---|
| W272 Titanium Dioxide - National - CLNC | .156 | .053 | .268 | .259 | .069 | .045 | .160 | .226 | .167 | .182 |
| N131 Channel Black - Cabot Co. 46Y | .118 | .141 | .011 | .019 | .006 | .022 | | | | |
| L112 Phthalocyanine blue - DuPont deNemours & Co. BT425D | .422 | .348 | .023 | .028 | .134 | .151 | | | .028 | .029 |
| G216 Phthalocyanine green - Sun Chemical 64-8142 | | | | | | | | | .034 | .034 |
| Y417 Indo-fast yellow - Allied Chemical Y-5713 | | | | | | | .077 | .066 | | |
| R434 Monostral Red DuPont deNemours & Co. RT-742-D | .104 | .093 | .356 | .345 | .131 | .129 | .026 | .029 | | |
| M404 Non-leafing Aluminum - Alcan Co. MD587 | .200 | .366 | .342 | .349 | .660 | .653 | .737 | .680 | .771 | .755 |

APPENDIX 8

```
OPTION? 1
SET? 1
CODE, LINE, GLOSS, PLACES   45 1 95 3
OPTION? 3
NO OF PIG? 4,1
PIG CODES? W272,N131,L112,R434,M404
SPECTRAL MATCH
W272    0.053    TGW-02   0.013
N131    0.141    TGN-01   0.249
L112    0.348    TGL-03   0.412
R434    0.093    TGR-06   0.093
M404    0.366    TGM-03   0.234
SUM OF SQUARES= 1.05438E-4
OPTION? 5
COLOR MATCH
W272    0.088    TGW-02   0.023
N131    0.124    TGN-01   0.226
L112    0.347    TGL-03   0.422
R434    0.109    TGR-06   0.112
M404    0.331    TGM-03   0.217
SUM OF SQUARES= 2.29023E-4
        DL       DA       DB       DE
DIF  −1.209   −0.39    −1.348   1.852
MET   0.822    0.628    0.838   1.331
DE= 2.281
```

APPENDIX 8-continued

```
MI= 2.542   2.023   3.249
OPTION? 2
CODE, LINE, GLOSS, PLACES   44 1 95 3
OPTION? 4
SPECTRAL MATCH
W272    0.259    TGW-02   0.093
N131    0.019    TGN-01   0.048
L112    0.028    TGL-03   0.048
R434    0.345    TGR-06   0.494
M404    0.349    TGM-03   0.317
SUM OF SQUARES= 5.55901E-4
OPTION? 5
COLOR MATCH
W272    0.23     TGW-02   0.081
N131    0.018    TGN-01   0.045
L112    0.033    TGL-03   0.055
R434    0.36     TGR-06   0.502
M404    0.358    TGM-03   0.318
SUM OF SQUARES= 1.09716E-3
        DL       DA       DB       DE
DIF   0.95    −0.639    0.266   1.175
MET  −0.59    0.509    −0.448   0.899
DE= 1.48
MI= 1.026   0.862   1.34
```

APPENDIX 9

COLOR DIFFERENCES BETWEEN EXPERIMENTAL AND PREDICTED FORMULATIONS

| Panel No. | No. of Pigments | Light Source C | | | Light Source A | | |
|---|---|---|---|---|---|---|---|
| | | Diffuse | Metallic | Total | Diffuse | Metallic | Total |
| 45 | 5 | 1.85 | 1.33 | 2.28 | 2.54 | 2.02 | 3.25 |
| 44 | 5 | 1.18 | .9 | 1.48 | 1.03 | .86 | 1.34 |
| 43 | 5 | 3.03 | 2.34 | 3.82 | 3.85 | 3.15 | 4.98 |
| 41 | 4 | 2.26 | 3.81 | 4.43 | 1.38 | 4.1 | 4.32 |
| 38 | 4 | 2.7 | 2.58 | 3.37 | 2.20 | 1.79 | 2.82 |

APPENDIX 10

```
MFORM        13:10EDT                       10/08/71
DATA FILE? MRDATA
OPTION? 2
CODE, LINE, GLOSS, PLACES 45 1 95 3
OPTION? 3

NO OF PIG? 6,1
PIG CODES? W272,N131,L112,G216,Y417,R434,M404
SPECTRAL MATCH

W272      0.024 TGW-02 0.006
N131      0.099 TGN-01 0.17
L112      0.314 TGL-03 0.359
G216      0     TGG-01 0
Y417      0.144 TGY-06 0.165
R434      0.117 TGR-06 0.113
M404      0.303 TGM-03 0.187
SUM OF SQUARES= 9.46704E-5
OPTION? 2
CODE, LINE, GLOSS, PLACES 44 1 95 3
OPTION? 4
SPECTRAL MATCH

W272      0.259 TGW-02 0.093
N131      0.019 TGN-01 0.047
L112      0.032 TGL-03 0.054
G216      0     TGG-01 0
Y417      0.01  TGY-06 0.017
R434      0.335 TGR-06 0.477
M404      0.346 TGM-03 0.313
SUM OF SQUARES= 7.71429E-4
OPTION? 2
CODE, LINE, GLOSS, PLACES 43 1 95 3
OPTION? 4
SPECTRAL MATCH

W272      0.036 TGW-02 0.011
N131      0.014 TGN-01 0.031
L112      0.154 TGL-03 0.226
G216      0     TGG-01 0
Y417      0.057 TGY-06 0.085
R434      0.132 TGR-06 0.165
M404      0.607 TGM-03 0.482
SUM OF SQUARES= 1.64869E-3
OPTION? 2
CODE, LINE, GLOSS, PLACES 41 1 95 3
OPTION? 4
SPECTRAL MATCH

W272      0.235 TGW-02 0.103
N131      0.005 TGN-01 0.015
L112      0     TGL-03 0
G216      0     TGG-01 0
Y417      0.034 TGY-06 0.07
R434      0.016 TGR-06 0.027
M404      0.71  TGM-03 0.785
SUM OF SQUARES= 5.56125E-3
OPTION? 2
CODE, LINE, GLOSS, PLACES 38 1 95 3
OPTION? 4
SPECTRAL MATCH

W272      0.182 TGW-02 0.077
N131      0.003 TGN-01 0.008
L112      0.03  TGL-03 0.059
G216      0.025 TGG-01 0.041
Y417      0.003 TGY-06 0.005
```

APPENDIX 10-continued

```
MFORM        13:10EDT                       10/08/71
R434      0      TGR-06 0
M404      0.758 TGM-03 0.81
SUM OF SQUARES= 2.13763E-3
```

APPENDIX 11

USE OF PROGRAM MFORM TO SELECT PIGMENTS
WGT. FRACTION PIGMENT

| PANEL NUMBER | 45 | | 44 | | 43 | | 41 | | 38 | |
|---|---|---|---|---|---|---|---|---|---|---|
| PIGMENT CODE | Exp. | Pred. | Exp. | Pred. | Exp. | Pred. | Exp. | Pred. | Exp. | Pred. |
| N272 | .156 | .024 | .268 | .259 | .069 | .036 | .160 | .235 | .167 | .182 |
| N131 | .118 | .099 | .011 | .019 | .006 | .014 | 0 | .005 | 0 | .003 |
| L112 | .422 | .314 | .023 | .032 | .134 | .154 | 0 | 0 | .028 | .03 |
| G216 | 0 | 0 | 0 | 0 | 0 | 0 | 0 | 0 | .034 | .025 |
| Y417 | 0 | .144 | 0 | .01 | 0 | .057 | .077 | .034 | 0 | .003 |
| R434 | .104 | .117 | .356 | .335 | .131 | .132 | .026 | .016 | 0 | 0 |
| M404 | .200 | .303 | .342 | .346 | .660 | .607 | .737 | .71 | .771 | .758 |

What is claimed is:

1. The method of selecting paint pigments to color match a paint coating containing metallic flake pigments comprising:

measuring in a spectrophotometer the total reflectance of said paint coating, rotating a plaque carrying said coating in a colorimeter, measuring in said colorimeter the tri-stimulus coordinates of said coating at a plurality of different viewing angles with respect to the surface of said plaque, generating the measured diffuse and angular reflectance of said coating from the measured total reflectance and the measured tri stimulus coordinates, generating in an automatic processing system a model which relates the diffuse and angular reflectance of a paint coating to the concentrations of paint pigments in said paint coating, and from said model selecting the paint pigments and concentrations which will produce a surface having diffuse and angular reflectance which will most nearly match the measured diffuse and angular reflectance.

2. The method recited in claim 1 further comprising:
generating from said model the predicted tri-stimulus coordinates at different viewing angles of a paint coating, varying the pigment concentrations in said model to obtain a least square fit between the predicted tri-stimulus coordinates at different viewing angles and the measured tri-stimulus coordinates at different viewing angles, and selecting the paint pigments which provide said least square fit.

3. The method recited in claim 2 wherein said predicted tri-stimulus coordinates are related to predicted diffuse and angular reflectance $R_d 40$ and $R_a'$ generated in said automatic processing system by the relationship:

$$G'(\theta) = (G_d')(GF(\theta)) + (G_a')(AGF(\theta)) + SG(\theta)$$

where $G'(\theta)$ is the predicted green tri-stimulus coordinate, $GF(\theta)$ is the geometric factor for diffuse green reflectance and $AGF(\theta)$ is the angular factor for angular green reflectance, $$G_d' = \int_{\lambda=400}^{\lambda=700} R_d'(\lambda) H_y(\lambda) d\lambda$$

$$G_a' = \int_{\lambda=400}^{\lambda=700} R_a'(\lambda) H_y(\lambda) d\lambda$$

$H_y$ is the green tri-stimulus value for the standard observer, and wherein similar equations define the coordinates $$R'(\theta) \text{ and } B'(\theta).$$

4. The method recited in claim 3 wherein said geometric and angular factors $GF(\theta)$ and $AGF(\theta)$ are determined from measurements from said spectrophotometer and said colorimeter at different viewing angles, said angular geometric factor $AGF(\theta)$ being given by:

$$AGF(\theta) = MG(\theta)/[G_T - G_d(0°)]$$

where $$G_T = \int_{400}^{700} R(\lambda) H_y(\lambda) d\lambda$$

$R(\lambda)$ = the spectrophotometer reflectance readings and $H_y(\lambda)$ = the standard tri-stimulus value
and where $$MG(\theta) = G(\theta) - G_d(0°) GF(\theta) - SG(\theta)$$

where $MG(\theta)$ = the metallic angular $G$ value
$G_d(0°)$ = the estimated diffuse $G$ value at 0°

$$= \frac{1}{3}\left[\frac{G(75°)}{GF(75°)} + \frac{G(80°)}{GF(80°)} + \frac{G(85°)}{GF(85°)}\right]$$

where $G(\theta)$ is the measured tri-stimulus coordinate at each of a plurality of viewing angles $\theta$, and $GF(\theta)$ is determined by the ratio $G(\theta) G(0°)$ where $G(\theta)$ is measured using a sample having zero surface gloss.

5. The method recited in claim 4 wherein the geometric factor $GF(\theta)$ is obtained by normalizing every measured tri-stimulus coordinate by dividing it by the measured value at a viewing angle of zero degrees while obtaining measurements from a sample having zero surface gloss.

6. The method recited in claim 1 wherein the paint coating includes both metallic pigments and diffusing pigments, said model being given by:

$$R_T' = \frac{S_{14}}{A + L_{1245}} + \frac{S_{124}S_5}{(A + L_{1245})(A + L_{124})} + \frac{S_2}{L_{1245}}$$

where $$A = \sqrt{L_{124}{}^2 - S_{124}{}^2}$$

where $R_T'$ = the predicted total reflectance
$S_1$ = the back scatter constant of the diffusing pigments
$K_1$ = the absorption constant of the diffusing pigments
$S_2, K_2$ = metallic reflectance and absorption cnstant
$S_4$ = diffuse back scatter and back reflectance of the metallic pigment
$S_5$ = forward scatter constant of the diffusing pigments
$L$ = the sum of $K + S$ over the subscripts indicated
$S$ = the sum of S over the subscripts indicated so that $$L_{13} = K_1 + S_1 + K_3 + S_3$$

and $$S_{14} = S_1 + S_4$$

and $$L_{15} = K_1 + S_1 + S_5.$$

7. The method recited in claim 6 wherein said constants are related to the concentrations of said pigments by the relationships.

$$K = \sum_{i=1}^{N} C_i K_i$$

$$S = \sum_{i=1}^{N} C_i S_i$$

where $C_1$ = the weight fraction of the ith pigment
$N$ = the number of pigments in the mixture.

8. The method recited in claim 1 wherein the measured value of diffuse reflectance is given by:

$$R_d(\lambda) = \frac{R(\lambda)}{S(\lambda)} - \frac{G_d(0°)H_y(\lambda)}{G_T} + \frac{1.275R_d(0°)[H_x(\lambda) - .166H_z(\lambda)]}{R_T} + \frac{.8467B_d(0°)H_z(\lambda)}{B_T}$$

where $S(\lambda) = H_y(\lambda) + 1.275[H_x(\lambda) - 0.166H_z(\lambda)] + 0.8467H_z(\lambda)$
$R(\lambda)$ = the total reflectance as measured on a spectrophotometer
where $H_y(\lambda)$, $H_x(\lambda)$ and $H_z(\lambda)$ are the tri-stimulus values of the standard observer, $G_d(0°)$, $R_d(0°)$ and $B_d(0°)$, are the measured tri-stimulus coordinates at a viewing angle of zero degrees, and $G_T$, $R_T$ and $B_T$ are the spectrophotometer reflectance readings integrated with respect to standard tri-stimulus values.

9. The method of selecting paint pigments to color match a metallic paint coating which includes formulating the predicted concentrations of paint pigments by the steps of:

a. measuring in a spectrophotometer the total reflectance of said metallic paint coating,
b. measuring the tri-stimulus coordinates of said coating,
c. computing the diffuse reflectance of said coating from said tri-stimulus coordinates, d. obtaining the angular reflectance of said paint coating as the difference between said total reflectance and said diffuse reflectance, e. generating predicted diffuse and angular reflectance from a model which relates reflectance to concentrations of paint pigments, and f. obtaining the predicted concentrations of paint pigments which produce the least square difference between predicted and measured values of diffuse and angular reflectance.

10. The method recited in claim 9 further including shading a batch of paint pigments to match said coating by the steps of:

f. mixing a batch of paint having said predicted concentrations, g. measuring the tri-stimulus coordinates of said batch at a plurality of different viewing angles with respect to the surface of said batch, h. generating from said model predicted values of diffuse and angular reflectance, i. generating from the predicted values of diffuse and angular reflectance and from geometric and angular factors the predicted tri-stimulus coordinates at each of a plurality of different viewing angles, j. generating the mean square difference between the predicted and measured tri-stimulus coordinates, k. varying pigment concentrations in said model to minimize the mean square differential between the predicted and measured tri-stimulus coordinates, and l. repeating steps $f$ and $g$ with a batch mixed with the new predicted pigment concentrations.

* * * * *